United States Patent
Takahashi et al.

(10) Patent No.: US 8,653,710 B2
(45) Date of Patent: Feb. 18, 2014

(54) PERMANENT MAGNET ELECTRIC MOTOR

(75) Inventors: Norio Takahashi, Izumi-ku (JP); Kazuto Sakai, Yokosuka (JP); Yutaka Hashiba, Yokosuka (JP); Kazuaki Yuuki, Tokorozawa (JP); Masanori Arata, Totsuka-ku (JP); Yusuke Matsuoka, Mie-gun (JP); Tadashi Tokumasu, Setagaya-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 248 days.

(21) Appl. No.: 13/140,669

(22) PCT Filed: Dec. 16, 2009

(86) PCT No.: PCT/JP2009/006935
§ 371 (c)(1),
(2), (4) Date: Sep. 2, 2011

(87) PCT Pub. No.: WO2010/070900
PCT Pub. Date: Jun. 24, 2010

(65) Prior Publication Data
US 2011/0309706 A1    Dec. 22, 2011

(30) Foreign Application Priority Data

Dec. 18, 2008  (JP) .................................. 2008-322612

(51) Int. Cl.
*H02K 21/12*    (2006.01)
*H02K 21/20*    (2006.01)
(52) U.S. Cl.
USPC ............ 310/156.47; 310/156.53; 310/156.76; 310/156.77; 310/181; 310/182; 310/183
(58) Field of Classification Search
USPC ............ 310/156.47, 156.53, 156.76, 156.77, 310/181, 182, 183
See application file for complete search history.

(56) References Cited

U.S. PATENT DOCUMENTS 3,898,491 A * 8/1975 Long et al. ............... 310/183
4,007,387 A * 2/1977 Rustecki ................... 310/181
(Continued)

FOREIGN PATENT DOCUMENTS

JP    52139905 A  * 11/1977  ............ H02K 23/38
JP    08182282 A  * 7/1996  ............ H02K 21/22
(Continued)

OTHER PUBLICATIONS

Translation of foreign document JP 10174324 A.*
(Continued)

*Primary Examiner* — Tran Nguyen
*Assistant Examiner* — Alex W Mok
(74) *Attorney, Agent, or Firm* — Oblon, Spivak, McClelland, Maier & Neustadt, L.L.P.

(57) ABSTRACT

A rotor has rotor cores divided in the axial direction. A permanent magnet is mounted at the position of each of the magnetic poles of cores. The permanent magnet of each magnetic pole is configured by a single tabular member that penetrates the two divided cores in the axial direction. Convex parts are respectively provided on the outer peripheries of the respective magnetic poles of the rotor cores along the axial direction of the rotor. The convex parts are provided to positions that are displaced for each of the two divided cores. The magnetic flux density increases in the convex parts, which becomes the magnetic pole center. Since the convex parts positions are displaced to each other, a skew function can be exhibited even if the permanent magnet is mounted at the same position.

18 Claims, 19 Drawing Sheets

(56) References Cited

U.S. PATENT DOCUMENTS

| | | | |
|---|---|---|---|
| 5,663,605 A * | 9/1997 | Evans et al. .................. 310/181 |
| 5,747,909 A * | 5/1998 | Syverson et al. ......... 310/156.56 |
| 6,087,751 A * | 7/2000 | Sakai ...................... 310/156.56 |
| 6,147,429 A * | 11/2000 | Akemakou et al. .......... 310/181 |
| 6,211,593 B1 | 4/2001 | Nashiki |
| 6,274,960 B1 * | 8/2001 | Sakai et al. ............. 310/156.02 |
| 6,331,741 B1 * | 12/2001 | Suzuki ...................... 310/49.11 |
| 6,800,977 B1 | 10/2004 | Ostovic |
| 7,436,096 B2 * | 10/2008 | Guven et al. ............ 310/156.53 |
| 2002/0190595 A1 * | 12/2002 | Han et al. ................. 310/156.53 |
| 2004/0212266 A1 | 10/2004 | Hans |
| 2005/0001503 A1 | 1/2005 | Hans |
| 2005/0001505 A1 * | 1/2005 | Hsu ........................ 310/156.56 |
| 2005/0104468 A1 | 5/2005 | Araki et al. |
| 2007/0090713 A1 * | 4/2007 | Arita et al. .................. 310/181 |
| 2007/0126305 A1 * | 6/2007 | Okuma et al. ........... 310/156.53 |
| 2007/0205689 A1 * | 9/2007 | Nemoto et al. ........... 310/156.47 |
| 2007/0210664 A1 * | 9/2007 | Matsunobu et al. ..... 310/156.53 |
| 2009/0184598 A1 * | 7/2009 | Nakano et al. ........... 310/156.78 |
| 2009/0236923 A1 * | 9/2009 | Sakai et al. .............. 310/156.43 |
| 2010/0171385 A1 | 7/2010 | Sakai et al. |

FOREIGN PATENT DOCUMENTS

| | | | | | |
|---|---|---|---|---|---|
| JP | 10 174324 | | 6/1998 | | |
| JP | 2000 134891 | | 5/2000 | | |
| JP | 2000 175389 | | 6/2000 | | |
| JP | 2000175416 A | * | 6/2000 | ............ | H02K 19/10 |
| JP | 2000 278895 | | 10/2000 | | |
| JP | 2001339919 A | * | 12/2001 | ............ | H02K 19/10 |
| JP | 2004 328992 | | 11/2004 | | |
| JP | 2005 051897 | | 2/2005 | | |
| JP | 2006060952 A | * | 3/2006 | | |
| JP | 2006121765 A | * | 5/2006 | | |
| JP | 2006 280195 | | 10/2006 | | |
| JP | 2006280195 A | * | 10/2006 | | |
| JP | 2008 048514 | | 2/2008 | | |
| JP | 2008048514 A | * | 2/2008 | | |
| JP | 2008 245368 | | 10/2008 | | |
| JP | 2008245368 A | * | 10/2008 | | |
| WO | WO 2008023413 A1 | * | 2/2008 | | |

OTHER PUBLICATIONS

Translation of foreign document JP 2000175389 A.*
Translation of foreign document JP 2000278895 A.*
Translation of foreign document JP 2008245368 A.*
International Search Report issued Mar. 16, 2010 in PCT/JP09/006935 filed Dec. 16, 2009.

* cited by examiner

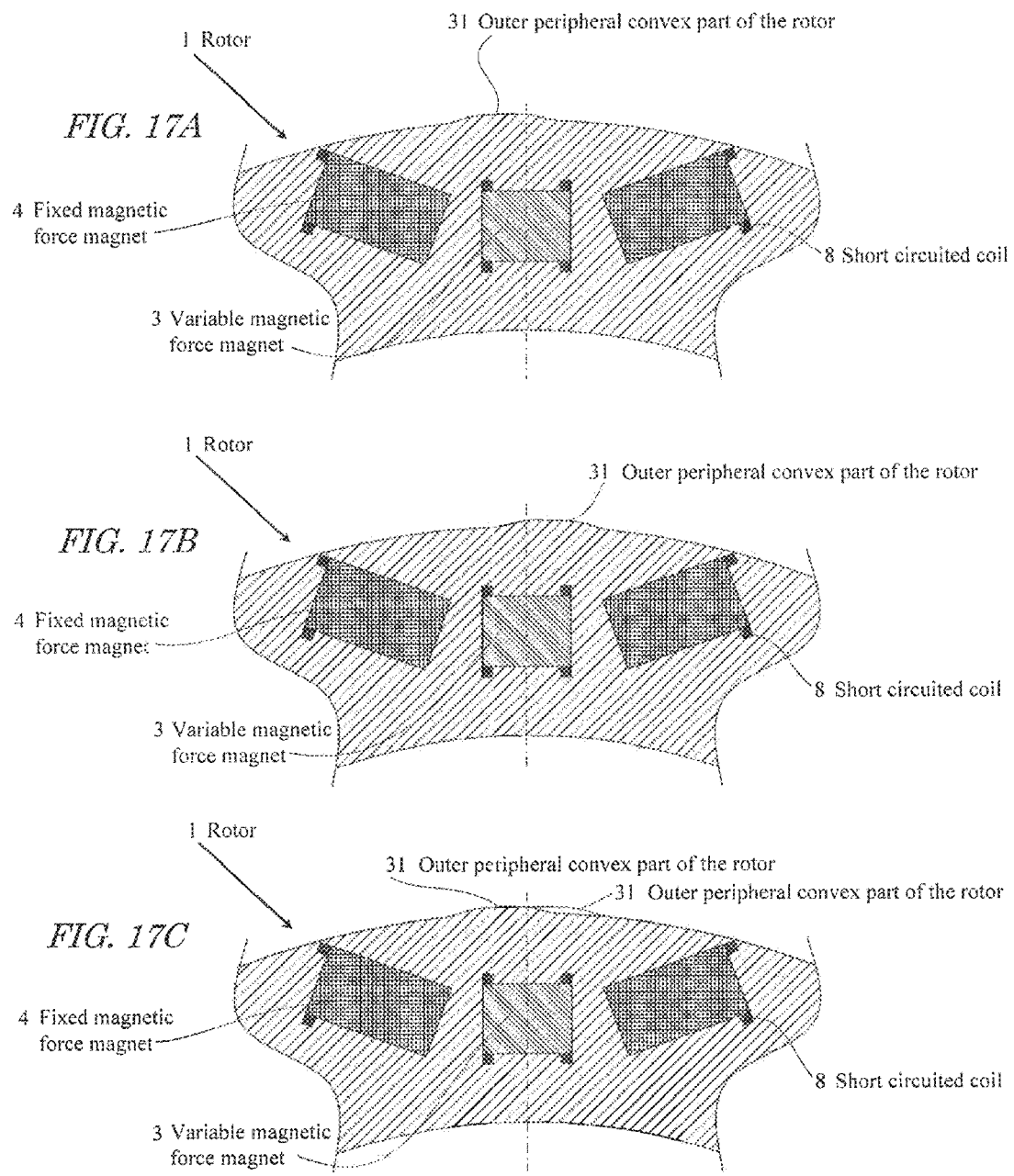

- PRIOR ART -

- PRIOR ART -

- PRIOR ART -

- PRIOR ART -

- PRIOR ART -

PERMANENT MAGNET ELECTRIC MOTOR

FIELD

The present invention relates to a permanent magnet electric motor in which a permanent magnet is built into a rotor, and particularly relates to a permanent magnet electric motor in which a permanent magnet is disposed to penetrate a core in the axial direction and which additionally realizes the skew function.

BACKGROUND

In recent years, permanent magnets of high magnetic energy products have been developed based on the remarkable research and development of permanent magnets, and the downsizing and higher output of electric motors are being promoted. In particular, with an electric motor for use in vehicles such as hybrid vehicles, higher efficiency is strongly demanded for controlling the gas emission and improving the mileage. Moreover, it is demanded of higher torque and higher output within a limited space where the mounting space is small, and therefore the electric motor of higher energy density is demanded more than ever. Consequently, pursuant to the foregoing demands, the electromagnetic excitation force of the electric motors is increasing, which gives rise to problems such as the increase in vibration and noise. Particularly, quietness inside the vehicle and less noise outside the vehicle are being strictly demanded for use in hybrid vehicles.

Thus, proposed is a rotor of a reluctance-type electric motor capable of reducing torque ripples, vibrations and noise by forming the rotor laminated core in a block shape, and shifting and binding the cores in a circumferential direction so as to obtain an effect that is similar to a skew (for example, refer to Patent Document 1).

In other words, with this reluctance-type electric motor, a magnetic convex part (d-axis) where the magnetic flux can easily pass through around the rotor and a magnetic concave part (q-axis) where the magnetic flux cannot easily pass through are formed in the same number as the number of poles. This electric motor has a high void magnetic flux density in relation to the armature in the magnetic convex part, has a low void magnetic flux density in the magnetic concave part with a large magnetic resistance, and generates reluctance torque based on such changes in the magnetic flux density. Particularly, with a permanent magnet-type reluctance electric motor in which a permanent magnet is embedded in a rotor and possessing magnetic saliency, torque is generated based on the magnetic suction power and the magnetic repelling force between the permanent magnet and the armature magnetic pole in addition to the reluctance torque, a large torque can be obtained as a whole, and the output density per volume of the electric motor can be increased.

With a permanent magnet electric motor in which a permanent magnet is built into this type of rotor, since the interlinkage magnetic flux of the permanent magnet is generated constantly at a given strength, the induced voltage generated by the permanent magnet will increase in proportion to the rotating speed. Thus, when performing variable speed operation from a low speed to a high speed, the induced voltage (counter electromotive voltage) generated by the permanent magnet will become extremely high in a high-speed rotation. When the induced voltage generated by the permanent magnet is applied to the electronic parts of an inverter and becomes a withstand voltage or higher, the electronic parts will break down. Thus, considered may be a design where the flux content of the permanent magnet is reduced so that it will be the withstand voltage or less, but in the foregoing case, the output and efficiency of the permanent magnet electric motor will deteriorate in a low speed area.

Thus, proposed is technology of disposing, within the rotor, a permanent magnet of low coercive force of a level in which the magnetic flux density is irreversibly changed by the magnetic field created with a d-axis current of a stator winding (hereinafter referred to as the "variable magnetic force magnet") and a permanent magnet of high coercive force having coercive force that is twice or more than that of the variable magnetic force magnet (hereinafter referred to as the "fixed magnetic force magnet"), and adjusting the total amount of interlinkage magnetic flux so that the total interlinkage magnetic flux generated by the variable magnetic force magnet and the fixed magnetic force magnet will decrease in a high revolution area where the power-supply voltage becomes a maximum voltage or greater (refer to Patent Document 2 and Patent Document 3).

Note that, since the flux content of the permanent magnet is decided based on the product of the coercive force and the thickness in the magnetization direction, when actually mounting the variable magnetic force magnet and the fixed magnetic force magnet in the rotor core, a permanent magnet in which the product of the coercive force and the thickness in the magnetization direction is small is used as the variable magnetic force magnet, and a permanent magnet in which the product of the coercive force and the thickness in the magnetization direction is large is used as the fixed magnetic force magnet. Moreover, generally speaking, an alnico magnet, a samarium-cobalt magnet (Sm—Co magnet) or a ferrite magnet is used as the variable magnetic force magnet, and a neodymium magnet (NdFeB magnet) is used as the fixed magnetic force magnet.

In this type of permanent magnet electric motor, when magnetizing a variable magnetic force magnet that was once demagnetized in a high revolution area, a phenomenon occurs where the magnetic field of the fixed magnetic force magnet disposed in the vicinity of the variable magnetic force magnet obstructs with the magnetization magnetic field that is created by a d-axis current, and the d-axis current (magnetization current) for the magnetization increases by that much. In order to deal with this kind of phenomenon, the present inventors and others proposed a permanent magnet electric motor capable of inhibiting the increase of the d-axis current during magnetization by disposing a short circuited coil in the vicinity of a fixed magnetic force magnet, generating an induced current in the short circuited coil based on a magnetic field generated by the d-axis current penetrating the short circuited coil, and negating the magnetic field that is generated in the fixed magnetic force magnet by using the foregoing induced current (Japanese Patent Application No. 2008-162203).

Patent Document 1: Japanese Patent Application Publication No. 2005-51897

Patent Document 2: Japanese Patent Application Publication No. 2006-280195

Patent Document 3: Japanese Patent Application Publication No. 2008-48514

Meanwhile, with a permanent magnet electric motor that is demanded of a compact size and high output, a large current and excitation magnetic force are required for obtaining high torque and high output, and since the armature field of return action is applied to the permanent magnet, there is a problem in that the permanent magnet becomes demagnetized. In addition, with a conventional reluctance-type electric motor, as shown in FIG. 19 and FIG. 20, a stepped skew of displacing and binding the block-shaped rotor laminated cores 2a, 2b and the permanent magnets 30a, 30b built therein in the circumferential direction is used to reduce the torque ripples, vibrations and noise. However, since the rotor cores 2a, 2b and the end faces of the permanent magnets 30a, 30b are in contact on the divided skew face S, the diamagnetic field generated by the armature reaction from the rotor cores 2a, 2b is applied to the end face and corners of the permanent magnets 30a, 30b, and, since the anti-demagnetization properties are weak, this causes the permanent magnet to become demagnetized.

Moreover, with a conventional variable magnetic force magnet-type electric motor, a stepped skewing as shown in FIG. 21 is performed by dividing the rotor core in order to similarly alleviate the torque ripples, vibrations and noise. In this kind of electric motor, when magnetizing a permanent magnet having a variable magnetic force configuring the magnetic pole of the rotor based on the magnetic field that is created by the armature winding, since the positions of the variable magnetic force magnets are different between the divided core parts, the magnetization directions of the variable magnetic force magnets are different in the axial direction (refer to FIG. 22), and it is therefore difficult to magnetize the variable magnetic force magnets, sufficient magnetization cannot be performed, and the magnetization current will increase.

In addition, in a variable magnetic force magnet-type electric motor, as shown in FIG. 23, since the rotor is internally provided with a conductive short circuited coil 8 to which flows a short-circuit current based on the magnetic flux that is generated during magnetization upon magnetizing the variable magnetic force magnet 3, it is necessary to bend the short circuited coil 8 at the divided skew face, and the insertion and assembly of the short circuited coil 8 are difficult, and the manufacturability of the rotor is extremely inferior. Particularly, certain variable magnetic force magnet-type electric motors have fixed magnetic force magnets 4a, 4b disposed on either end of the variable magnetic force magnets 3a, 3b, and, since the short circuited coil 8 is disposed to surround the variable magnetic force magnets 3a, 3b and the adjacent fixed magnetic force magnets 4a, 4b in each of the divided cores, if the short circuited coil 8 is bent at the divided skew face, difficult operations will be required for mounting the short circuited coil 8 in the core.

SUMMARY

The present invention was devised in order to resolve the foregoing problems, and an object thereof is to provide a permanent magnet electric motor capable of inhibiting the demagnetization of the permanent magnets without deteriorating the motor characteristics, of being manufactured easily, and of magnetizing the variable magnetic force magnets by effectively and irreversibly changing the flux content with a smaller magnetization current.

In order to achieve the foregoing object, the permanent magnet electric motor according to the present invention is characterized in exhibiting a skew function by adopting a configuration where the mounting positions of permanent magnets within a rotor core are the same, but the magnetic properties in the respective parts of the core are made different.

In the foregoing case, as the configuration of causing the magnetic properties in the respective cores to be different, the following means, for example, can be adopted independently or in combination.

(1) Forming a rotor periphery of a rotor core as a convex shape, and arbitrarily displacing and disposing the center in a circumferential direction of a mounting hole of the permanent magnet and the center of the outer peripheral convex part of the rotor.

(2) Disposing a magnetic barrier made from a non-magnetic material to be asymmetrical relative to the permanent magnet peripheral side and the center in the circumferential direction of the mounting hole of the permanent magnet.

(3) Disposing a plurality of magnets with different magnetic forces within a rotor core radial cross section, and causing the magnet alignment thereof to be different depending on the respective cores.

(4) Disposing a slit at the permanent magnet peripheral side and a boundary position of the magnets with different magnetic forces.

(5) Displacing the positions of the magnetic poles in the radial cross section by unequally disposing, in the circumferential direction, only the outer peripheral convex parts provided to the respective magnetic poles of the rotor for each magnetic pole.

(6) Unequally arranging the outer peripheral convex parts in the circumferential direction, and also unequally displacing the circumferential direction positions of the permanent magnets in the respective magnetic poles in a direction that is opposite to the outer peripheral convex parts.

Moreover, combining the configuration of (1) to (6) above to the permanent magnet electric motor which combines the variable magnetic force magnet and the short circuited coil, and performing magnetization when the center of the magnetic field which magnetizes the variable magnetic force magnet created by the armature winding and the center of the magnetic pole of the variable magnetic force magnet of the rotor coincide are also modes according to the present invention.

The permanent magnet electric motor according to the present invention having the foregoing configuration is able to yield a stepped skew effect (reduction of torque ripples, vibrations and noise). In addition, since the permanent magnets and their mounting holes are of the same position and shape along the axial direction of the core, the diamagnetic field generated by the armature reaction will not be applied to the magnets, and it is thereby possible to inhibit demagnetization. Moreover, since there is no need to divide the permanent magnets, the number of components can be reduced and the manufacturability will improve.

BRIEF DESCRIPTION OF THE DRAWINGS

FIGS. 17A-17C are views each showing an enlarged radial cross section of the rotor in the ninth embodiment according to the present invention.

FIGS. 18A-18C are views each showing an enlarged radial cross section of the permanent magnet electric motor in the ninth embodiment according to the present invention, and illustrates a state of the magnetic flux generated by the magnetization current passing through the protrusions 30a, 30b of the second core part.

DETAILED DESCRIPTION (1) First Embodiment

Figure 1:
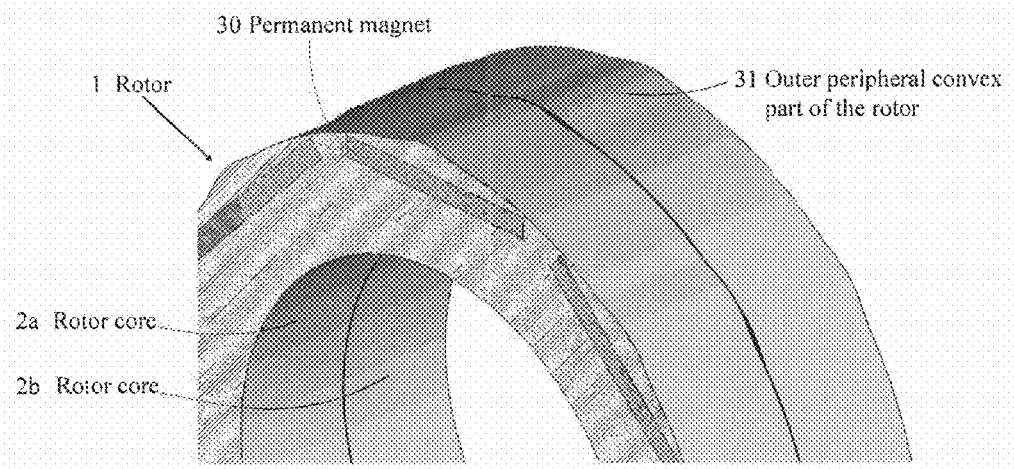
FIG. 1 is an enlarged perspective view of the rotor in the first embodiment according to the present invention.
Figure 2:
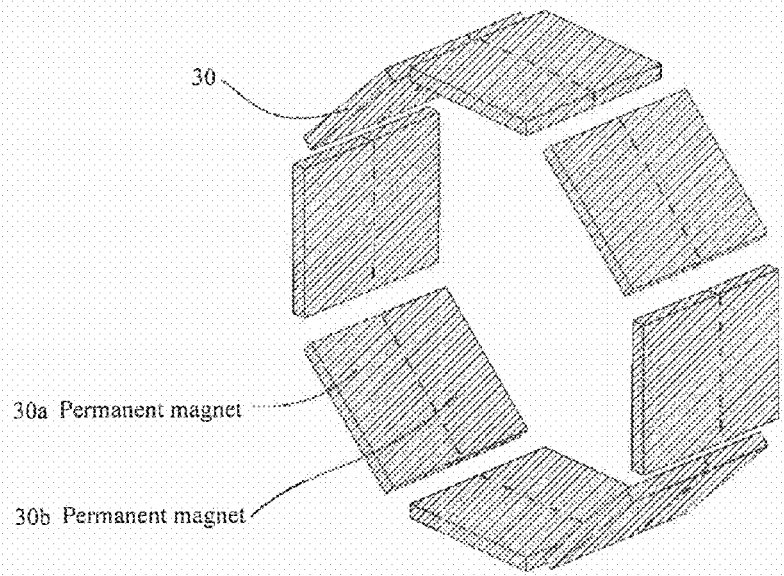
FIG. 2 is a perspective view of the permanent magnet in the first embodiment according to the present invention.

The first embodiment according to the present invention is now explained with reference to FIG. 1. The permanent magnet electric motor of this embodiment comprises rotor cores 2a, 2b that are divided in the axial direction. A permanent magnet 30 is mounted at the position of the respective magnetic poles in the rotor cores. The permanent magnet 30 of the respective magnetic poles is configured, as shown in FIG. 2, from a single tabular member that penetrates the two divided rotor cores 2a, 2b in the axial direction. In other words, the permanent magnets 30 are disposed at the same positions in the respective magnetic poles of the divided rotor cores 2a, 2b. Thus, one permanent magnet 30 configures the core parts 30a, 30b disposed in the magnetic poles of the respective rotor cores 2a, 2b.

Convex parts 31a, 31b are respectively provided around the respective magnetic poles of the respective rotor cores 2a, 2b along the axial direction of the rotor. The convex parts 31a, 31b are provided to positions that are displaced for each of the two rotor cores 2a, 2b that were divided. In other words, as shown with the cross section of FIG. 3, the convex parts 31a, 31b are provided at positions that are displaced at the same angle in either direction with the center line of the magnetic pole as the boundary.

Figure 3A:
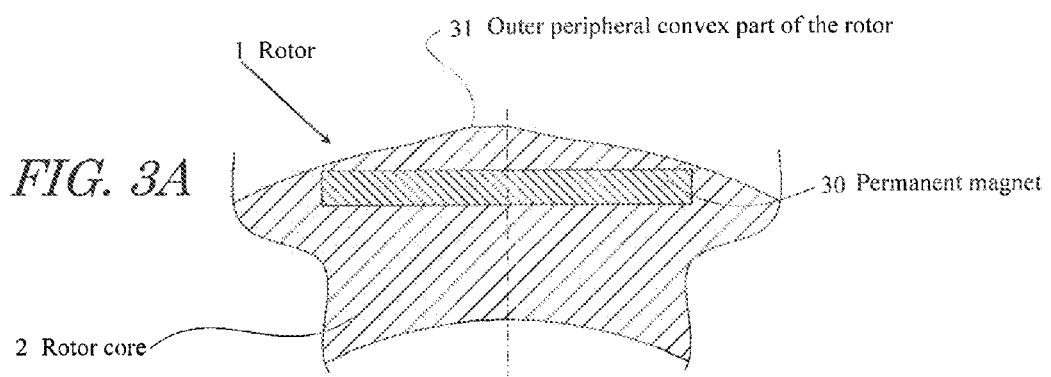
FIGS. 3A-3C are views each showing an enlarged radial cross section of the rotor in the first embodiment according to the present invention.
Figure 3B:
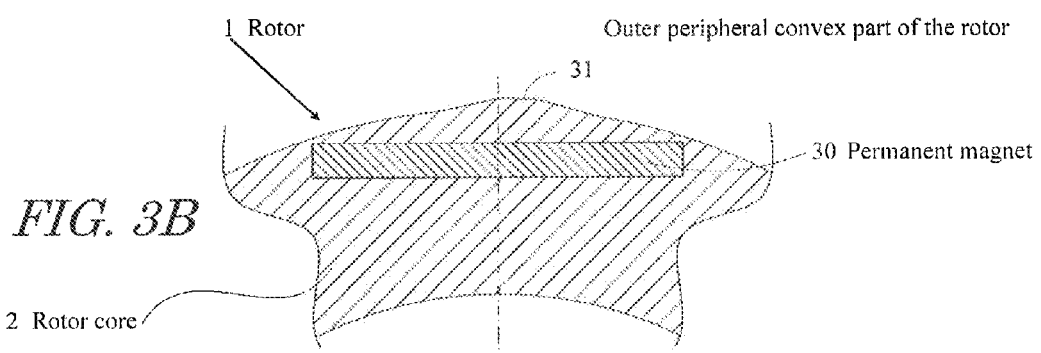

In order to manufacture the rotor cores 2a, 2b configured as described above, as shown in FIG. 3A, one rotor core 2a is manufactured with a laminated silicon steel plate in which the permanent magnets 30 will be disposed symmetrically relative to the center line in the magnetic pole. In the foregoing case, the permanent magnets 30 are not yet fitted in the mounting holes. A laminated silicon metal plate of a similar shape is used to manufacture a core block as shown in FIG. 3A, and this is turned upside down in order to manufacture the other rotor core 2b shown in FIG. 3B. Thereafter, the two rotor cores 2a, 2b are superimposed and, by inserting a single permanent magnet 30 into its mounting hole, the convex parts 31a, 31b are displaced at the same angle relative to the center line of the magnetic pole, and the permanent magnets 30 are able to obtain the rotor cores 2a, 2b of this embodiment provided at the same positions of the magnetic pole.

With the first embodiment configured as described above, the magnetic flux density of the rotor will increase in the convex parts 31a, 31b at the rotor periphery, and that portion becomes the magnetic pole center of the magnetic pole. Thus, as a result of configuring the rotor cores 2a, 2b by displacing and superimposing, in the circumferential direction, the convex parts 31a, 31b in the axial direction, it is possible to obtain the stepped skew effect i.e., reduction of torque ripples, vibrations and noise of the rotor. In addition, since the permanent magnets 30 and their mounting holes are of the same position and shape along the axial direction of the core, the diamagnetic field generated by the armature reaction will not be applied to the magnets, and it is thereby possible to inhibit demagnetization. Moreover, since there is no need to divide the permanent magnets, the number of components can be reduced and the manufacturability will improve. Moreover, since the skew effect can be obtained by reversing and superimposing the rotor cores and only one shape of the same cross section is required, there is no need to prepare a plurality of core molds, and the manufacturing costs can thereby be reduced. Moreover, since the magnetic pole position can be confirmed at a glance at the rotor core periphery, it is possible to prevent errors during the assembly of the rotor core.

(2) Second Embodiment

Figure 4:
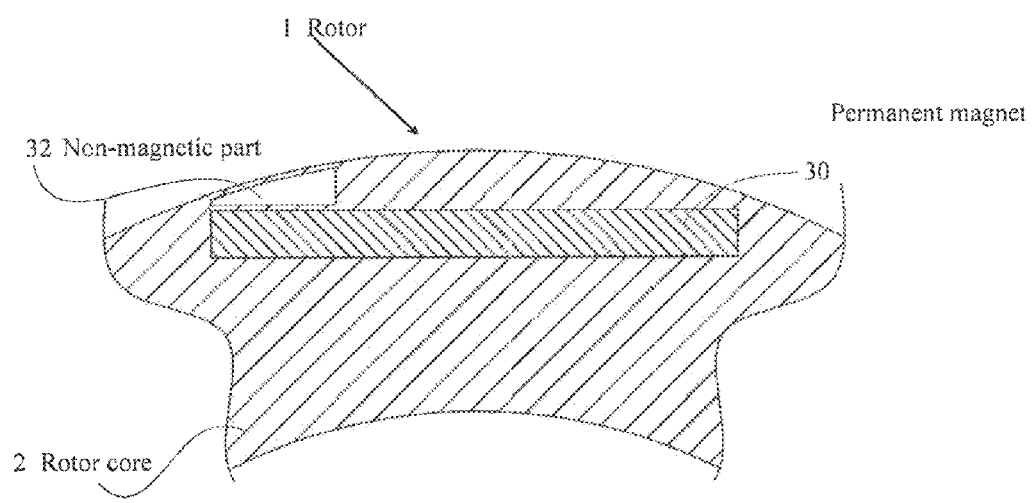
FIG. 4 is an enlarged radial cross section of the rotor in the second embodiment according to the present invention.

FIG. 4 is a cross section showing the second embodiment according to the present invention. In the second embodiment, the permanent magnets 30 provided in the rotor cores 2a, 2b are displaced relative to the center in the circumferential direction thereof, and the void as the non-magnetic part 32 is displaced to one side relative to the center line of the magnetic pole. In the foregoing case, the direction that the non-magnetic part 32 is displaced relative to the center of the magnetic pole regarding each of the divided rotor cores 2a, 2b is of the same angle of the opposite direction. Moreover, the shape of the non-magnetic part 32 and the shape of the permanent magnet 30 are the same shape.

The rotor cores 2a, 2b are manufactured with the same method as the first embodiment, and the rotor cores 2a, 2b of the same shape are manufactured and one is reversed and superimposed in the axial direction so that the non-magnetic part 32 becomes displaced, whereby the rotor 1 is configured.

With the second embodiment configured as described above, due to the existence of the non-magnetic part 32, the magnetic flux generated by the permanent magnet 30 will become biased, and the center of the magnetic pole will be displaced to one side. Thus, as with the first embodiment, since the demagnetization of the permanent magnets can be inhibited and there is no need to divide the permanent magnets, the number of components can be reduced and the manufacturability will improve. Moreover, with the second embodiment, since the convex parts 31a, 31b do not exist around the rotor, an equal skew effect can be obtained while maintaining the minimal gap of the average space (air gap) between the rotor 1 and the stator 10.

(3) Third Embodiment

Figure 5:
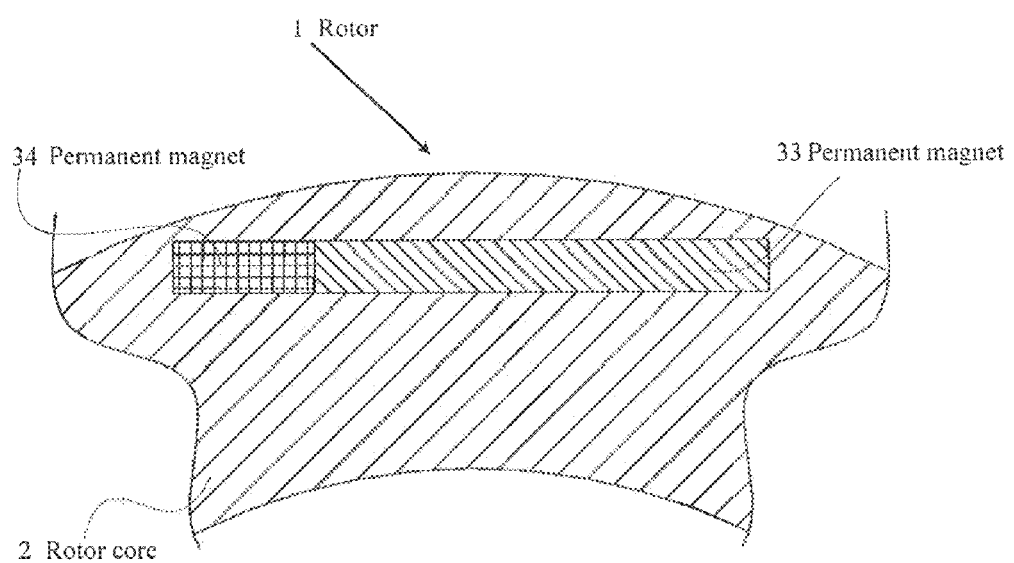
FIG. 5 is an enlarged radial cross section of the rotor in the third embodiment according to the present invention.
Figure 6:
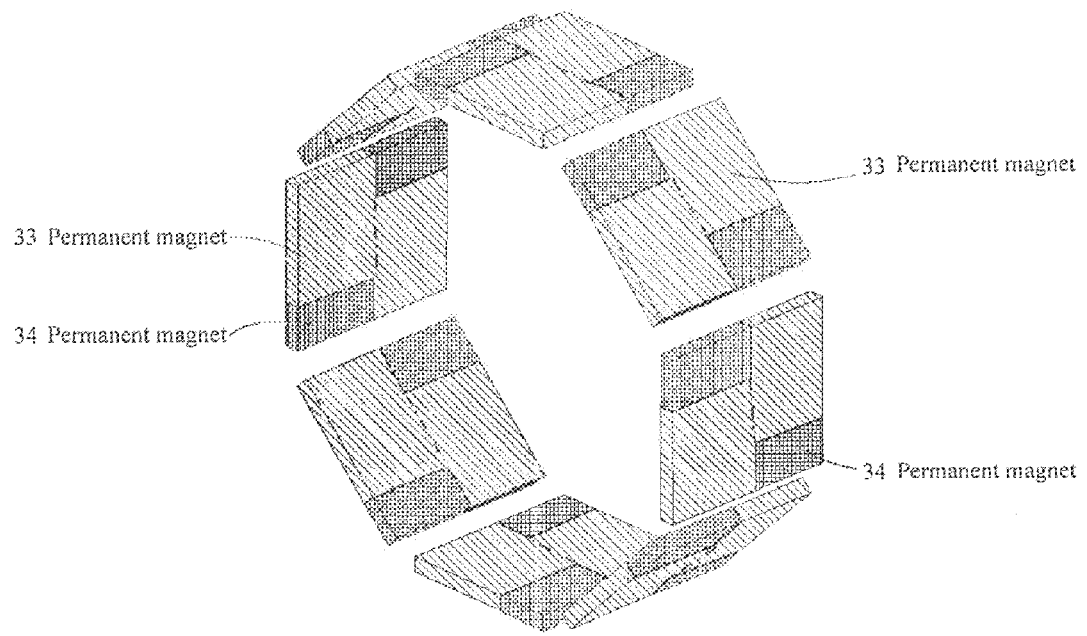
FIG. 6 is a perspective view of the permanent magnet in the third embodiment according to the present invention.

FIG. 5 is a cross section showing the third embodiment according to the present invention. In this third embodiment, since a permanent magnet 33 with strong magnetic force and a permanent magnet 34 with weak magnetic force are disposed in alignment, the magnetic flux density on the side of the permanent magnet 33 with strong magnetic force will increase, and the magnetic pole center of that magnetic pole will become displaced to the side of the permanent magnet 33 with strong magnetic force. Then, the permanent magnet configured as described above is inserted into the rotor cores 2a, 2b, and, in the foregoing case, as shown in FIG. 6, two types of magnets with different positions of the two strong and weak permanent magnets 33, 34 for one rotor core 2a and for the other rotor core 2b are prepared, these are further integrated to manufacture a single permanent magnet to be mounted. Thereafter, this single permanent magnet is inserted into the laminated rotor cores 2a, 2b to configure the rotor 1.

In the foregoing case, there is no need to bind the permanent magnets into one, and the individual permanent magnets may also be mounted in order within the rotor cores 2a, 2b. Moreover, the rotor cores 2a, 2b can also be manufactured from a laminated silicon steel plate or other materials as a single block. In addition, as with each of the foregoing embodiments, it is also possible to manufacture the rotor cores 2a, 2b of the same shape including the arrangement of the permanent magnets 33, 34, and reverse one and superimpose the two.

According to the third embodiment, the rotor cores 2a, 2b are laminated to configure the rotor 1 by rearranging the alignment of the permanent magnets 33, 34 in the axial direction. Thus, as with the first embodiment, since the demagnetization of the permanent magnet can be inhibited and the magnet mounting hole is straight in the axial direction, the magnet can be cast (bonded) in advance and mounted, and the number of components can be reduced and the manufacturability will improve. Moreover, since the rotor cores 2a, 2b do not need a convex shape or voids, the cross section shape is simple and the core mold can be manufactured inexpensively. In addition, since the rotor core stress caused by the rotational centrifugal force can be kept low, it is possible to obtain a solid rotor.

(4) Fourth Embodiment

Figure 7:
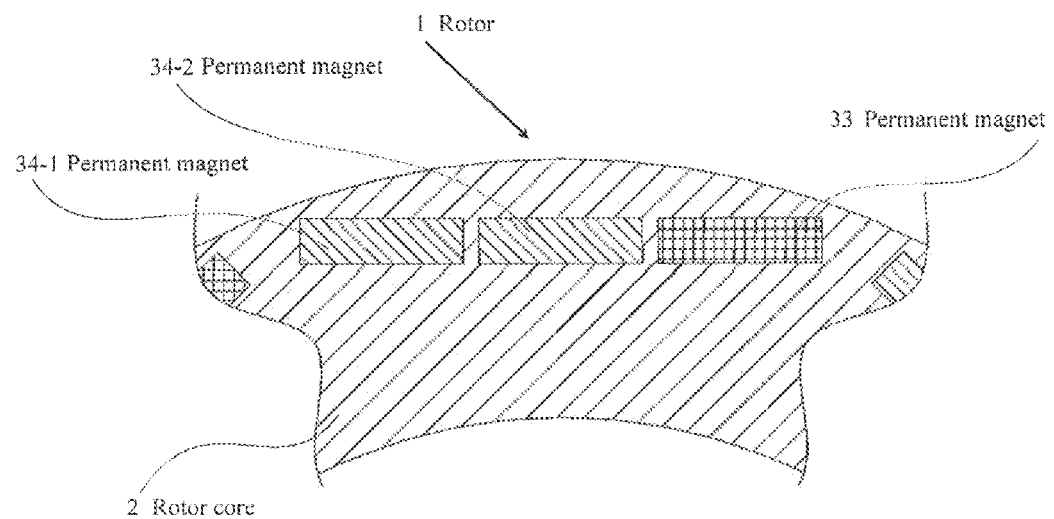
FIG. 7 is an enlarged radial cross section of the rotor in the fourth embodiment according to the present invention.

FIG. 7 shows the fourth embodiment according to the present invention. This fourth embodiment is a modified example of the third embodiment, and one permanent magnet 33 with strong magnetic force and two permanent magnets 34-1, 34-2 with different weak magnetic forces are mounted in the rotor cores 2a, 2b. In this third embodiment, since a configuration of disposing the permanent magnets 33, 34-1, 34-2 having magnetic forces of three stages (multiple stages) in the magnetic pole is adopted, a smooth (fine) skew can be performed in the axial direction.

Moreover, with the third embodiment, since magnets with different magnetic forces are inserted into one hole, it is difficult to insert them into the magnet mounting hole unless they are integrated in advance with an adhesive or the like since they will repel. Meanwhile, with the fourth embodiment, since the magnet mounting holes are divided, the insertion and assembly of the magnets can be performed easily. Moreover, since the mounting holes of the permanents magnets are partitioned by using a plurality of partition numbers, the rotational centrifugal force of the permanent magnets will be dispersed. Thus, the rotor core stress can be kept low and a solid rotor can be obtained.

(5) Fifth Embodiment

Figure 8:
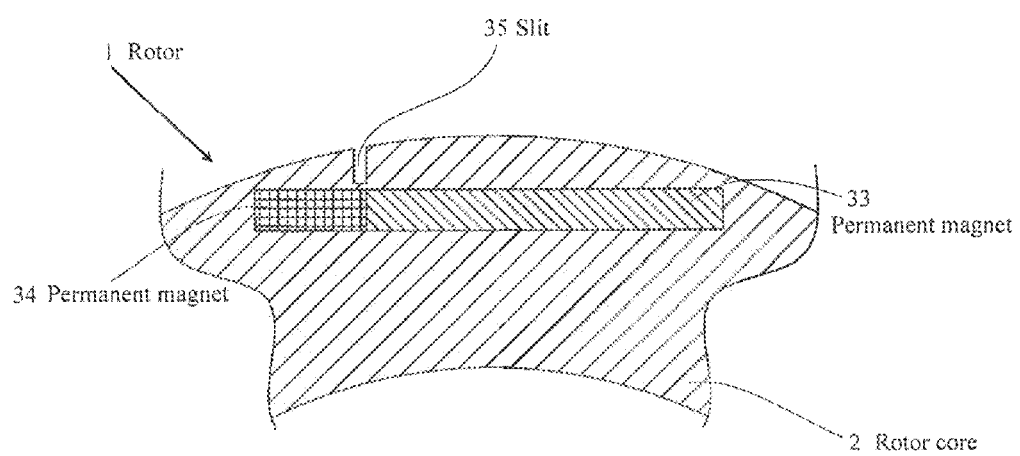
FIG. 8 is an enlarged radial cross section of the rotor in the fifth embodiment according to the present invention.

FIG. 8 is a cross section of the fifth embodiment according to the present invention. In the fifth embodiment, a slit 35 is additionally provided to the periphery of the rotor cores 2a, 2b of the third embodiment. In the foregoing case, the slit is provided to a position that is symmetrical across the center line of the magnetic pole in the divided rotor cores 2a, 2b; that is, as with the first or second embodiment, the rotor cores 2a, 2b of the same shape are manufactured, and these are reversed and laminated.

In the fifth embodiment, as with the third embodiment, since the demagnetization of the permanent magnet can be inhibited and the magnet mounting hole is straight in the axial direction, the magnet can be cast (bonded) in advance and mounted, and the number of components can be reduced and the manufacturability will improve. In addition, since the peripheral side magnetic path of the permanent magnet 33 with strong magnetic force and the permanent magnet 34 with weak magnetic force is partitioned and that portion becomes the magnetic barrier, the magnetic path is effectively separated. Thus, it becomes possible to displace the center of the magnetic pole more to the side of the permanent magnet 33 with strong magnetic force, and the skew effect can be increased. Moreover, the demagnetization of the permanent magnet can also be inhibited.

Particularly, since the slit 35 is disposed in the vicinity of the boundary of the permanent magnets 33, 34 with different magnetic forces, the magnetic path of the permanent magnet periphery core part is divided. Thus, since the magnetic fluxes of magnets with different magnetic forces will not get mixed easily, the center of the magnetic pole can be further displaced, and a high skew effect can be obtained. Moreover, since the magnetic pole position can be confirmed at a glance at the rotor core periphery, it is possible to prevent errors during the assembly of the rotor core.

(6) Sixth Embodiment

Figure 9:
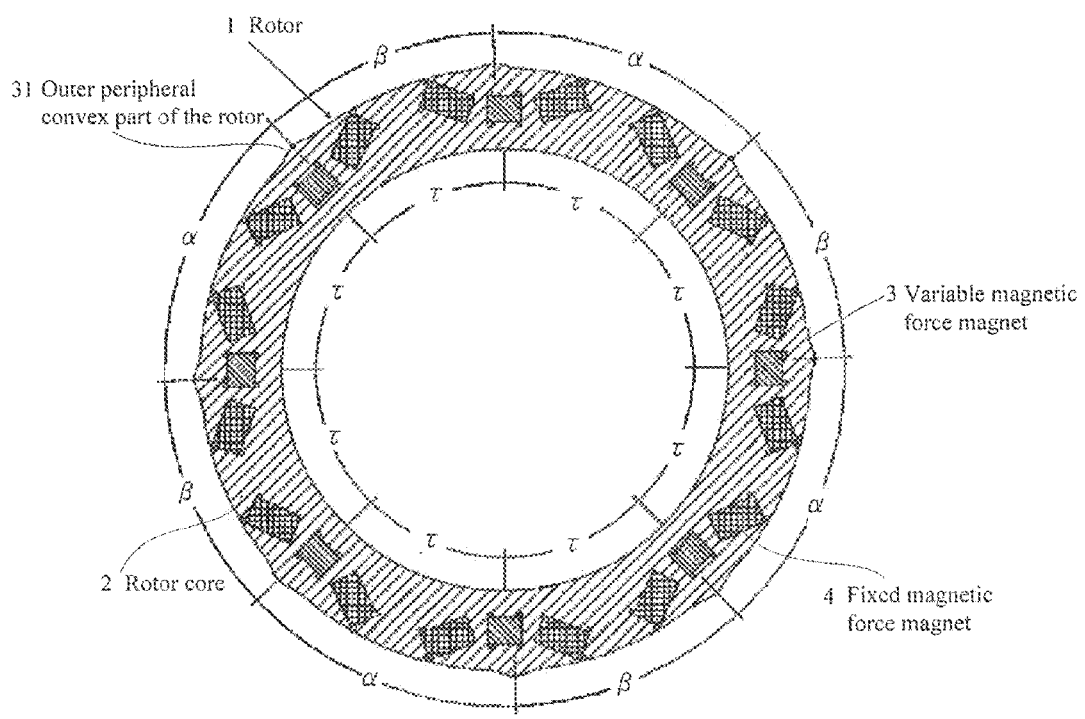
FIG. 9 is a cross section of the rotor in the sixth embodiment according to the present invention.

FIG. 9 is a cross section of the sixth embodiment according to the present invention. In the sixth embodiment, the skew effect is obtained by displacing the positions of the magnetic poles in the radial cross section as a result of unequally arranging only the outer peripheral convex part 31 provided to the respective poles of the rotor 1 in the circumferential direction for each magnetic pole. Specifically, the permanent magnets are arranged so that the angle of the magnetic pole center shown with τ in the diagram (center of the variable magnetic force magnet 3 of the respective magnetic poles) becomes equal in all magnetic poles, and the outer peripheral convex part 31 is provided so that its angle will differ, such as being α or β, for each adjacent magnetic pole.

In the foregoing case, unlike the first embodiment, there is no need to divide the rotor core 2 in its axial direction. Moreover, with the sixth embodiment, three permanent magnets are respectively provided to the respective magnetic poles, whereby the illustrated example disposes the variable magnetic force magnet 3 in the center and the fixed magnetic force magnets 4, 4 on either end thereof. However, a single permanent magnet may be disposed, or the non-magnetic part 32, the permanent magnets 33, 34, and the slit 35 of the shapes shown in the foregoing second embodiment to fifth embodiment may also be disposed.

With the sixth embodiment, since the permanent magnets and their mounting holes are of the same position and shape along the axial direction, the diamagnetic field generated by the armature reaction will not be applied to the permanent magnet easily, and it is possible to inhibit demagnetization. In addition, since there is no need to divide the permanent magnet, the number of components can be reduced and the manufacturability will improve. Moreover, since the rotor core 2 adopts a configuration where only the outer peripheral convex part is arranged unequally in the circumferential direction, there is no need to reverse it in the axial direction and laminate the same for the assembly, and the manufacturability will improve. Particularly, since the skew effect can be obtained with one shape of the same cross section, there is no need to prepare a plurality of core molds, and the manufacturing costs can thereby be reduced. Consequently, as with each of the foregoing embodiments, the demagnetization of the permanent magnets can be inhibited while obtaining the skew effect.

(7) Seventh Embodiment

Figure 10:
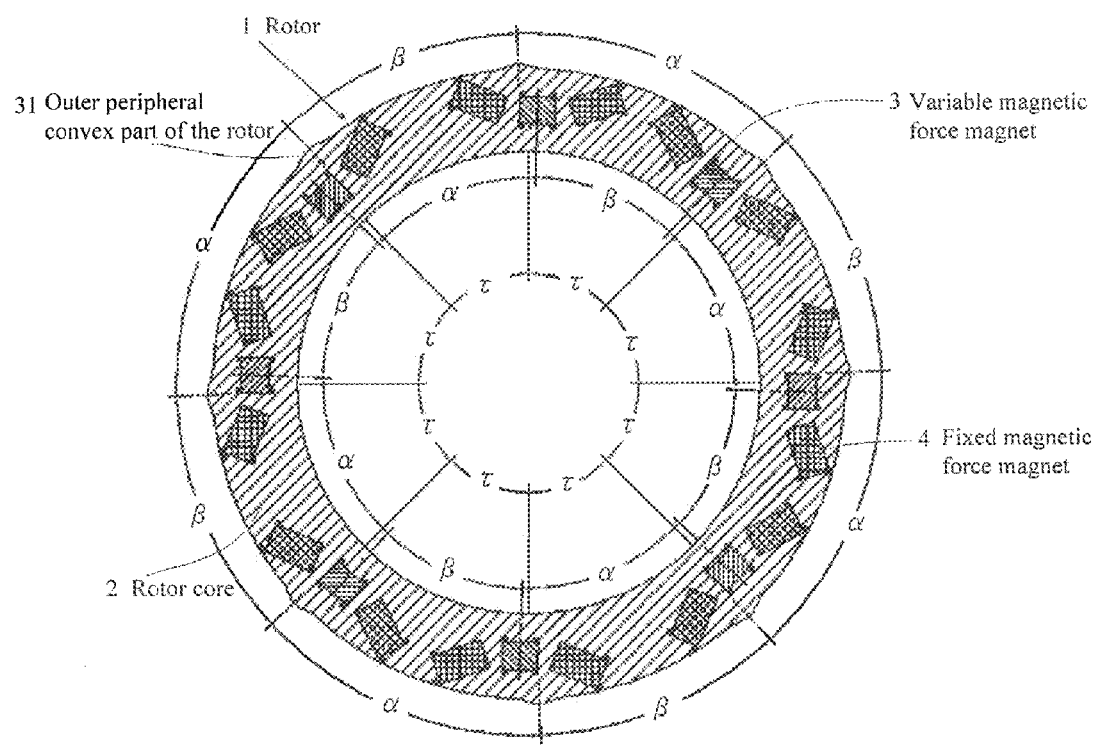
FIG. 10 is a cross section of the rotor in the seventh embodiment according to the present invention.

FIG. 10 is a cross section of the seventh embodiment according to the present invention. In the seventh embodiment, as with the sixth embodiment, the skew angle (displacement angle) is further increased by unequally arranging the outer peripheral convex part 31 in the circumferential direction, and also unequally displacing the circumferential direction positions of the permanent magnets 3, 4, 4 in the respective magnetic poles in a direction that is opposite to the outer peripheral convex part 31. In other words, with the seventh embodiment, the angle of the center of the permanent magnet 3 in the circumferential direction and the center of the outer peripheral convex part of the rotor 31 is arbitrarily displaced and arranged so that the angle between the respective magnetic poles will differ, such as being α or β, relative to the angle of the magnetic pole center shown with τ in the diagram. Moreover, the outer peripheral convex part 31 is also provided so that its angle will differ, such as being α or β, for each adjacent magnetic pole. Moreover, the permanent magnet 3 and the outer peripheral convex part of the rotor 31 are disposed so that they will be symmetrical relative to the rotation axis when viewing the overall rotor.

With the seventh embodiment, the outer peripheral convex part 31 and the respective permanent magnets 3, 4, 4 only need to be unequally arranged in the circumferential direction of the rotor 1, and there is no need to divide the rotor core in the axial direction. Thus, there is no need to reverse the rotor core 2 in the axial direction and laminate the same for the assembly, and the manufacturability will improve. In addition, as with each of the foregoing embodiments, the demagnetization of the permanent magnets can be inhibited while obtaining the skew effect. Moreover, since the skew effect can be obtained with one shape of the same cross section, there is no need to prepare a plurality of core molds, and the manufacturing costs can thereby be reduced.

Moreover, with the unequal arrangement of only the convex part shape or only the permanent magnet position, a large displacement amount (skew amount) of the magnetic pole is required if the number of stator slots is few relative to the number of rotor poles. However, it is difficult to change the magnet position within the limited rotor core area, and the displacement amount of the magnetic pole cannot be increased due to problems in terms of the strength of the rotor core (when arranged unequally, the deformation caused by the rotational centrifugal force will not be equal, and the generated stress will increase). Accordingly, by combining the convex part shape and the magnet position, the displacement amount can be increased and the skew effect can be sufficiently obtained.

(8) Eighth Embodiment

Figure 11:
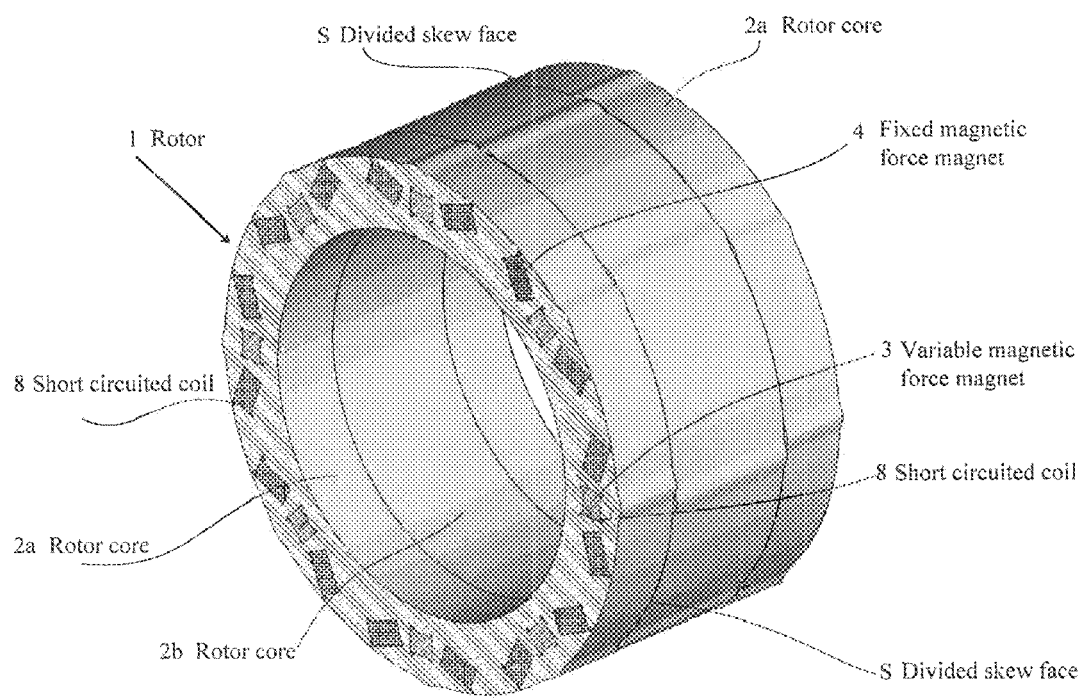
FIG. 11 is a perspective view of the rotor in the eighth embodiment according to the present invention.

FIG. 11 is a perspective view showing the eighth embodiment according to the present invention. In the eighth embodiment, a rotor core 2b in which the rotor cores 2a, 2a were reversed are laminated between the two rotor cores 2a, 2a where only the outer peripheral convex part 31 provided to the respective magnetic poles of the rotor 1 shown as the sixth embodiment is unequally arranged in the circumferential direction for each magnetic pole. In the foregoing case, the rotor core 2b disposed in the center has a double thickness of the rotor core 2a on either end.

With the eighth embodiment, by adopting a configuration where only the outer peripheral convex part 31 is arranged unequally in the circumferential direction and reversing the rotor core 2b and superimposing it in the axial direction to configure the rotor 2, it is possible to obtain a greater skew effect in comparison to the configuration of the sixth embodiment. Particularly, there is a possibility that the skew effect cannot be sufficiently obtained only by offsetting the outer peripheral convex part 31, and, by reversing and laminating the core in addition to offsetting the outer peripheral convex part 31, the skew amount (displacement angle) can be increased, whereby the skew effect can be increased.

Note that, even if the rotor core 2b is reversed and superimposed, since the permanent magnets 3, 4 and their mounting holes are of the same position and shape along the axial direction, the diamagnetic field generated by the armature reaction will not be applied to the permanent magnet easily, and it is possible to inhibit demagnetization. In addition, since there is no need to divide the permanent magnet, the number of components can be reduced and the manufacturability will improve.

Note that, as a modified example of the eighth embodiment, in substitute for obtaining the skew effect by offsetting the outer peripheral convex part 31 of the rotor cores 2a, 2b, it is also possible to obtain the skew effect based on the void or arrangement of strong and weak permanent magnets as shown in the second embodiment to the fifth embodiment. In the foregoing case, the same effect as the eighth embodiment can be obtained without having to change the configuration of the laminated rotor cores 2a, 2b in any way.

(9) Ninth Embodiment

FIG. 12 to FIG. 18 show the ninth embodiment according to the present invention. In the ninth embodiment, a pair of fixed magnetic force magnets 4, 4 sandwiching the variable magnetic force magnet 3 is provided in one magnetic pole. The configuration and operation of this embodiment are now explained in detail.

(9-1) Fundamental Configuration

Figure 12:
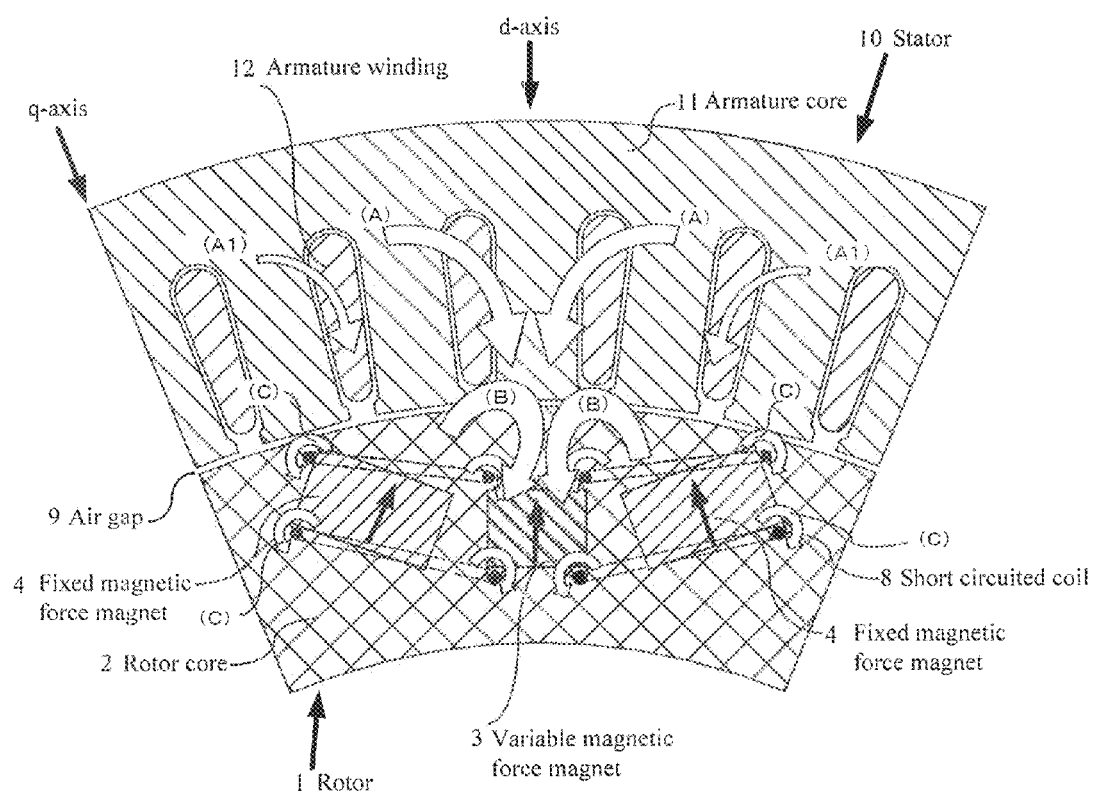
FIG. 12 is an enlarged radial cross section of the rotor in the ninth embodiment according to the present invention, and illustrates a state of demagnetizing the variable magnetic force magnet 3 with the d-axis current.
Figure 13:
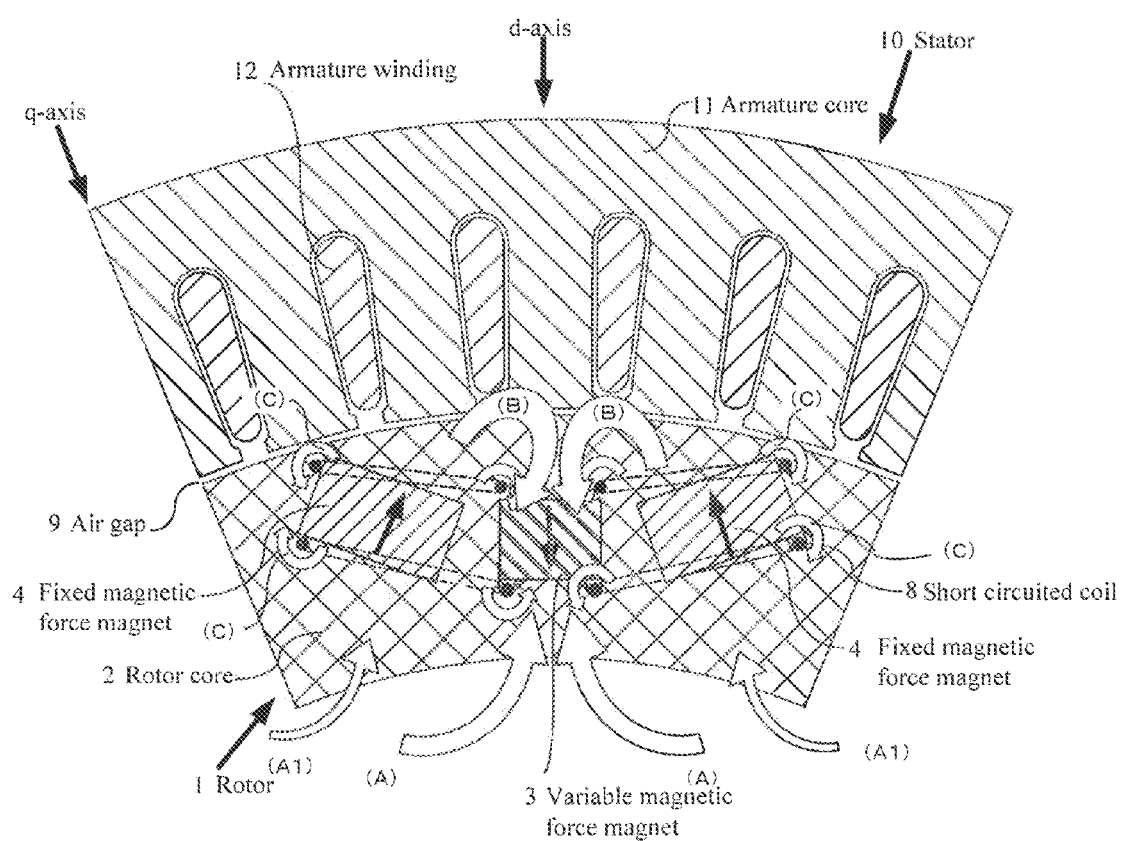
FIG. 13 is an enlarged radial cross section of the rotor in the ninth embodiment according to the present invention, and illustrates a state of magnetizing the variable magnetic force magnet 3 with the d-axis current.

The rotor 1 of the ninth embodiment is configured, as shown in FIG. 12 and FIG. 13, from a rotor core 2, a variable magnetic force magnet 3, and a fixed magnetic force magnet 4. The rotor core 2 is configured by laminating silicon steel plates, and the foregoing permanent magnet is embedded in the rotor core 2. In the embodiments, a ferrite magnet or an alnico magnet was used as the variable magnetic force magnet 3, and a ferrite magnet was used in this embodiment. A NdFeB magnet was used as the fixed magnetic force magnet 4. The coercive force of the variable magnetic force magnet was set to 280 kA/m, and the coercive force of the fixed magnetic force magnet was set to 1000 kA/m. The variable magnetic force magnet 3 is disposed in the rotor core 2 along the d-axis at the center of the magnetic pole, and its magnetization direction is substantially a circumferential direction. The fixed magnetic force magnet 4 is disposed in the rotor core 2 on either end of the variable magnetic force magnet 3 so that the magnetization direction will have a predetermined angle relative to the d-axis direction.

The short circuited coil 8 is provided to surround the fixed magnetic force magnet 4 embedded in the rotor core 2. The short circuited coil 8 is configured from a ring-shaped conductive member, and provided to the magnetic path portion of the fixed magnetic force magnet 4 excluding the variable magnetic force magnet 3. In the foregoing case, the short circuited coil 8 is provided around the fixed magnetic force magnet 4 with the magnetization direction of the fixed magnetic force magnet 4 as the central axis.

Figure 3C:
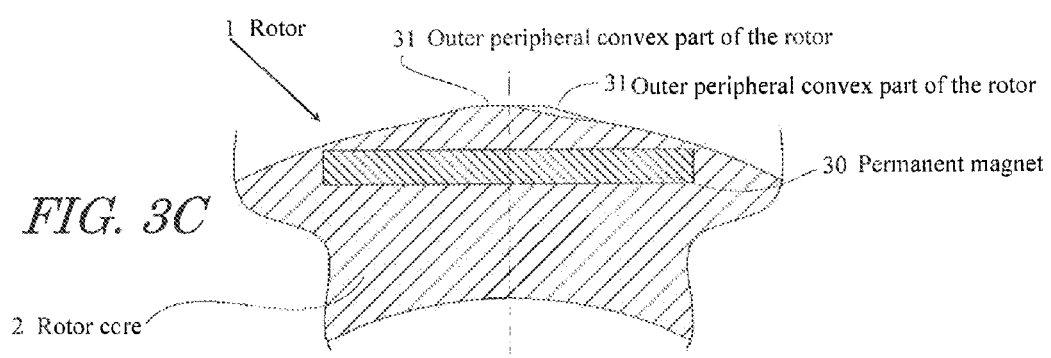

In this embodiment, the short circuited coil 8 is provided above and below the fixed magnetic force magnet 4, respectively, but it may also be provided to one of above or below the fixed magnetic force magnet 4. Moreover, the short circuited coil 8 is provided in parallel to the upper face and lower face (direction that is perpendicular to the magnetization direction) of the fixed magnetic force magnet, but as shown in FIGS. 3 and 4, it is also possible to provide one or two in an X-shape in the diagonal direction of the short circuited coil. In addition, other than providing the short circuited coil 8 in close contact with the surface of the fixed magnetic force magnet, it may also be provided to surround the fixed magnetic force magnet and the bridge part 6 between the fixed magnetic force magnet and the variable magnetic force magnet as shown in the diagram. Moreover, in substitute for the short circuited coil, a conductive member such as a conductive plate may be provided to the upper and lower faces and the periphery of the fixed magnetic force magnet 4.

The short circuited coil is a type in which a short-circuit current of a level that changes the magnetization of the variable magnetic force magnet 3 flows for 1 second or less, and which attenuates the short-circuit current by 50% or more within 1 second thereafter. Moreover, it would be efficient if the inductance value and the resistance value of the short circuited coil 8 are set to a value that causes the flow of a short-circuit current of a level that changes the magnetization of the variable magnetic force magnet 3.

Figure 14:
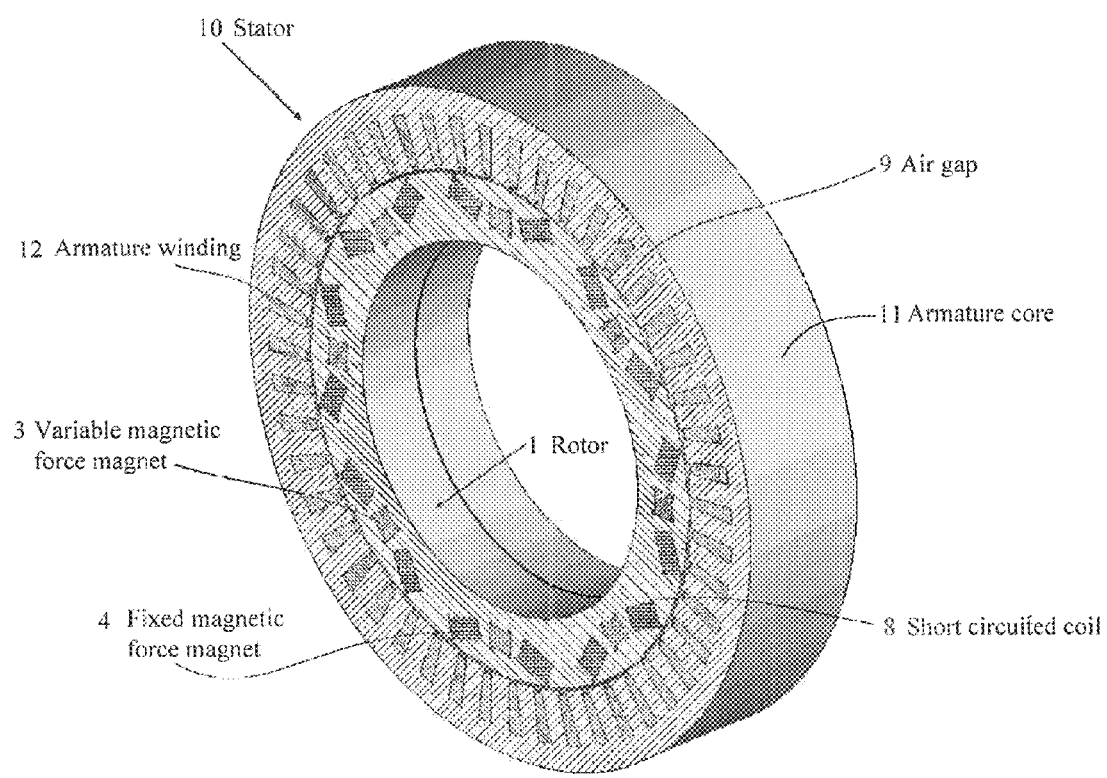
FIG. 14 is a perspective view of the rotor and the stator in the ninth embodiment according to the present invention.

As shown in FIG. 14, a stator 10 is provided at the outer periphery of the rotor 2 via an air gap 9. The stator 10 includes an armature core 11 and an armature winding 12. An induced current is induced to the short circuited coil 8 based on the magnetization current flowing to the armature winding 12, and the magnetic flux that penetrates the short circuited coil 8 is formed by the induced current. The magnetization direction of the variable magnetic force magnet 3 reversibly changes based on the magnetization current flowing to the armature winding 12; that is, the flux content of the variable magnetic force magnet 3 is irreversibly changed by magnetizing the permanent magnet 3 by the magnetic field generated by the d-axis current during the operation of the permanent magnet electric motor in relation to the variable magnetic force magnet and the fixed magnetic force magnet. In the foregoing case, the torque of the electric motor is controlled by the q-axis current simultaneously with causing the d-axis current for magnetizing the variable magnetic force magnet 3 to flow.

Moreover, based on the magnetic flux generated by the d-axis current, the current (total current upon synthesizing the q-axis current and the d-axis current) and the amount of interlinkage magnetic flux of the armature winding generated by the variable magnetic force magnet and the fixed magnetic force magnet (the amount of interlinkage magnetic flux of the overall armature winding configured from the magnetic flux generated in the armature winding based on the total current of the electric motor and the magnetic flux generated by the rotor-side variable magnetic force magnet and fixed magnetic force magnet) are changed substantially reversibly. Particularly, in this embodiment, the variable magnetic force magnet 3 is irreversibly changed by the magnetic field generated based on a momentarily large d-axis current. Operation is performed by causing a d-axis current to continuously flow within a range where irreversible demagnetization is hardly generated or slight irreversible demagnetization is generated in the foregoing state. The d-axis current in this case works to promote the current phase and adjust the terminal voltage.

(9-2) Regarding the Divided Core

Figure 15:
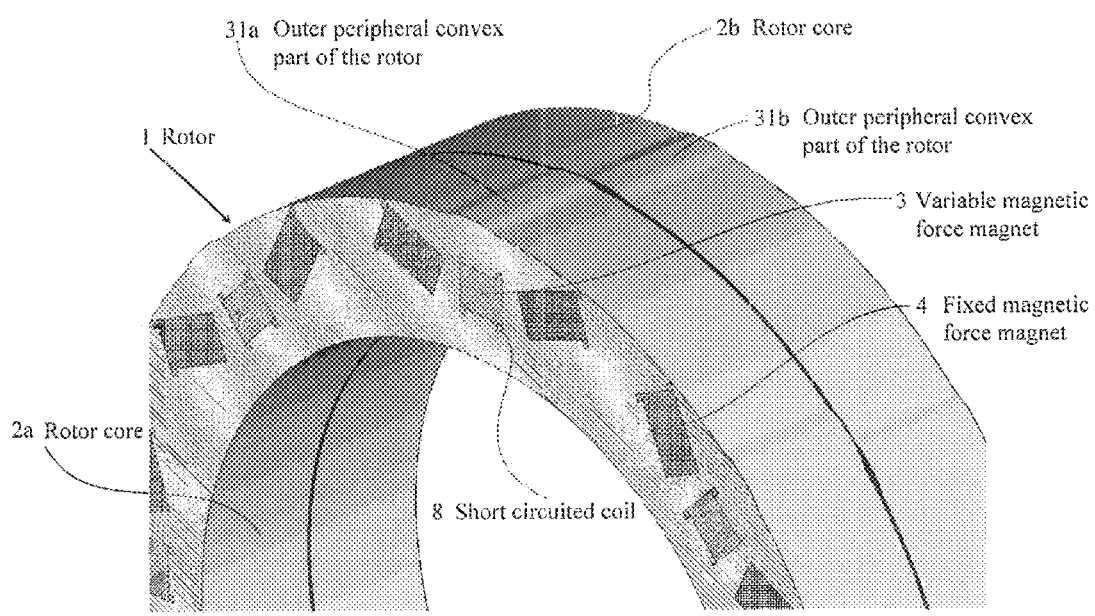
FIG. 15 is an enlarged perspective view of the rotor in the ninth embodiment according to the present invention.
Figure 16:
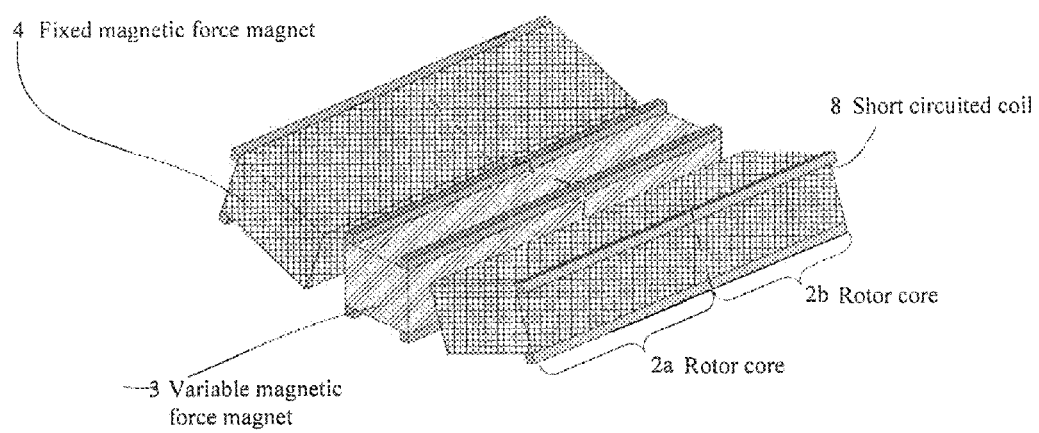
FIG. 16 is an enlarged perspective view of the permanent magnet and the short circuited coil in the ninth embodiment according to the present invention.

In this embodiment, with respect to the rotor, as shown in FIG. 15, the outer peripheral convex parts 31a, 31b are disposed in the respective rotor cores 2a, 2b by being displaced in the circumferential direction, but the permanent magnets 3, 4 and the short circuited coil 8 penetrate the two rotor cores 2a, 2b as a single bar-shaped member as shown in FIG. 16. As a method of manufacturing this kind of rotor, as with the first embodiment, the rotor cores 2a, 2b of the same shape are superimposed inside out as shown in FIGS. 17A to 17C.

Note that, in this embodiment, although offset outer peripheral convex parts 31a, 31b for exhibiting the skew effect between the divided rotor cores 2a, 2b were used, it is also possible to obtain the skew effect with the non-magnetic part 32 or the slit 35 as in the second to fifth embodiments. In the foregoing case also, a single bar-shaped member is used for the permanent magnets 3, 4 and the short circuited coil 8 and penetrates the two rotor cores 2a, 2b that were divided.

(9-3) Operation of Demagnetization and Magnetization

The operation during magnetization and during demagnetization in the permanent magnet electric motor of this embodiment having the foregoing configuration is now explained. Note that the direction of the magnetic force generated by the armature winding 12 and the short circuited coil 8 is shown with an arrow in the respective diagrams.

In this embodiment, a magnetic field is formed by causing a pulse-like current, in which the conducting period is an extremely-short time of approximately 0.1 ms to 100 ms, to flow to the armature winding 12 of the stator 10, and the magnetic field A is caused to work on the variable magnetic force magnet 3 (refer to FIG. 12). The pulse current which forms the magnetic field A for magnetizing the permanent magnet is the d-axis current component of the armature winding 12 of the stator 10.

If the thickness of the two types of permanent magnets is made to be substantially the same, the change in the magnetized state of the permanent magnet caused by the field of action generated by the d-axis current will change based on the size of the coercive force. A negative d-axis current, which generates a magnetic field in a direction that is opposite to the magnetization direction of the permanent magnet, is conducted to the armature winding 12 in a pulse-like manner. When the magnetic field A within the magnet that changed due to the negative d-axis current becomes −280 kA/m, the coercive force of the variable magnetic force magnet 3 will be 280 kA/m and, therefore, the magnetic force of the variable magnetic force magnet 3 will considerably decrease irreversibly.

Meanwhile, since the coercive force of the fixed magnetic force magnet 4 is 1000 kA/m, the magnetic force will not decrease irreversibly. Consequently, when the pulse-like d-axis current becomes 0, only the variable magnetic force magnet 3 becomes a demagnetized state, and the amount of interlinkage magnetic flux generated by the overall magnets can be decreased. In addition, when an opposing magnetic field that is greater than −280 kA/m is applied, the variable magnetic force magnet 3 is magnetized in the reverse direction and the polarity is inverted. In the foregoing case, since the magnetic flux of the variable magnetic force magnet 3 and the magnetic flux of the fixed magnetic force magnet 4 negate each other, the total interlinkage magnetic flux of the permanent magnets will become minimum.

In the foregoing case, since the direction of the magnetic force of the fixed magnetic force magnet 4 will become the direction from the fixed magnetic force magnet 4 to the variable magnetic force magnet 3 as shown in B of FIG. 12, it will coincide with the direction of the magnetic force of the magnetic field generated by the armature winding 12, and, therefore, strong magnetic force will work in the direction of demagnetizing the variable magnetic force magnet 3. Simultaneously, an induced current that will negate the magnetic field A of the armature winding 12 is generated in the short circuited coil 8, and a magnetic field having a magnetic force direction as shown with arrow C in FIG. 12 is generated by the foregoing induced current. The magnetic force C generated by the short circuited coil 8 will also work so that the magnetization direction of the variable magnetic force magnet 3 is directed in the reverse direction. As a result of the above, the demagnetization and polarity inversion of the variable magnetic force magnet 3 are performed efficiently.

The process (magnetization process) of increasing the total interlinkage magnetic flux of the permanent magnets and restoring it to become maximum is now explained. In a state where the demagnetization is complete, as shown in FIG. 13, the polarity of the variable magnetic force magnet 3 is inverted, and a positive d-axis current, which generates a magnetic field of a reverse direction (initial magnetization direction shown in FIG. 12) relative to the inverted magnetization, is conducted to the armature winding 12. The magnetic force of the variable magnetic force magnet 3 of the inverted reverse polarity decreases as the magnetic field increases, and eventually becomes 0. When the magnetic field generated by the positive d-axis current is additionally increased, the polarity is inverted and magnetized in the direction of the initial polarity. When 350 kA/m as the magnetic field that is required for a substantially complete magnetization is applied, the variable magnetic force magnet is magnetized and generates a substantially maximum magnetic force.

In the foregoing case, as with the case during demagnetization, the d-axis current does not need to be increased with continuous conduction, and a current that realizes the target magnetic force can be caused to flow as a momentary pulse current. Meanwhile, since the coercive force of the fixed magnetic force magnet 4 is 1000 kA/m, the magnetic force of the fixed magnetic force magnet 4 will not change irreversibly even when the magnetic field generated by the d-axis current works thereon. Consequently, when the pulse-like positive d-axis current becomes 0, only the variable magnetic force magnet 3 becomes a magnetized state, and the amount of interlinkage magnetic flux generated by the overall magnets can be increased. It is thereby possible to return the amount of interlinkage magnetic flux to the original maximum amount of interlinkage magnetic flux.

As described above, by causing the momentary magnetic field generated by the d-axis current to work on the variable magnetic force magnet 3 and the fixed magnetic force magnet 4, it is possible to irreversibly change the magnetic force of the variable magnetic force magnet 3 and arbitrarily change the total amount of interlinkage magnetic flux of the permanent magnets.

(9-4) Operation of Short Circuited Coil 8

The operation of the short circuited coil 8 is now explained. Since the variable magnetic force magnet 3 and the fixed magnetic force magnet 4 are embedded in the rotor core 2 and thereby configure the magnetic circuit, the magnetic field generated by the d-axis current not only works on the variable magnetic force magnet 3, it also works on the fixed magnetic force magnet 4. Originally, the magnetic field caused by the d-axis current is used for changing the magnetization of the variable magnetic force magnet 3. Thus, the magnetic field generated by the d-axis current is caused not to work on the fixed magnetic force magnet 4, and caused to be concentrated on the variable magnetic force magnet 3.

In this embodiment, the short circuited coil 8 is disposed in the fixed magnetic force magnet 4 and its peripheral bridge part 6. In the foregoing case, the short circuited coil 8 is disposed with the magnetization direction of the fixed magnetic force magnet 4 as the central axis. As shown in FIG. 13, when performing magnetization in the magnetization direction of the variable magnetic force magnet 3, an induced current of negating the magnetic field A will flow to the short circuited coil 8 if the magnetic field A1 generated by the d-axis current works on the fixed magnetic force magnet 4. Accordingly, since the magnetic field A1 generated by the d-axis current and the magnetic field C generated by the short-circuit current work and negate each other in the fixed magnetic force magnet 4, there will hardly be any increase or decrease of the magnetic field. That is, since the magnetic field A1≅0, the variable magnetic force magnet 3 can be effectively magnetized with a smaller magnetization current.

Here, since the fixed magnetic force magnet 4 will not be affected by the d-axis current generated by the short circuited coil 8 and hardly any increase or decrease of the magnetic flux will occur, the magnetic saturation of the armature core 11 caused by the d-axis current can also be alleviated. In other words, when the magnetic field A generated by the d-axis current passes through the magnetic path formed between the armature windings 12, there is a possibility that the armature core 11 will be subject to magnetic saturation at such portion. However, in this embodiment, the portion within the magnetic field C of the short circuited coil 8 which passes through the magnetic path of the armature core 11 works in a direction that is opposite to the magnetic field A generated by the d-axis current to realize A1≅0, and the magnetic path of the armature core is alleviated from becoming subject to magnetic saturation.

Moreover, in this embodiment, since the short circuited coil 8 is provided to surround the bridge part 6, a short-circuit current will flow to the short circuited coil 8 even by the magnetic field A2 that works on the bridge part 6. In the foregoing case, since the short circuited coil 8 is disposed in the vicinity of the variable magnetic force magnet 3, the magnetic field that works on components other than the variable magnetic force magnet can be efficiently negated.

In addition, since fixed magnetic force magnet 4 will not be affected by the d-axis current generated by the short circuited coil 8 and hardly any increase or decrease of the magnetic flux will occur, the magnetic saturation of the armature core 11 caused by the d-axis current can also be alleviated. In other words, when the magnetic field A generated by the d-axis current passes through the magnetic path formed between the armature windings 12, there is a possibility that the armature core 11 will be subject to magnetic saturation at such portion. However, in this embodiment, since the portion within the magnetic field C of the short circuited coil 8 negates the magnetic field A1+magnetic field A2 and makes the magnetic field A1+magnetic field A2≅0, the components generated by the magnetic field A1 and the magnetic field A2 in the magnetic flux that passes through the magnetic path of the armature core 11 will decrease, and the magnetic path of the armature core 11 is alleviated from becoming subject to magnetic saturation.

(9-5) Effect of Ninth Embodiment

In the ninth embodiment, since the variable magnetic force magnet 3 has a small coercive force, since demagnetization caused by the armature reaction will easily occur, demagnetization occurs on the skew face upon performing a standard rotor stepped skew, and considerably deteriorate the motor characteristics. In this embodiment, since there is no need to perform a stepped skew, the demagnetization of the variable magnetic force magnet 3 and the fixed magnetic force magnets 4, 4 can be inhibited while yielding the skew effect. Moreover, since there is no need to bend the short circuited coil 8 at the skew face, the assembly of the short circuited coil 8 and the assembly of the rotor can be facilitated, and manufacturing costs can thereby be reduced.

Figure 18A:
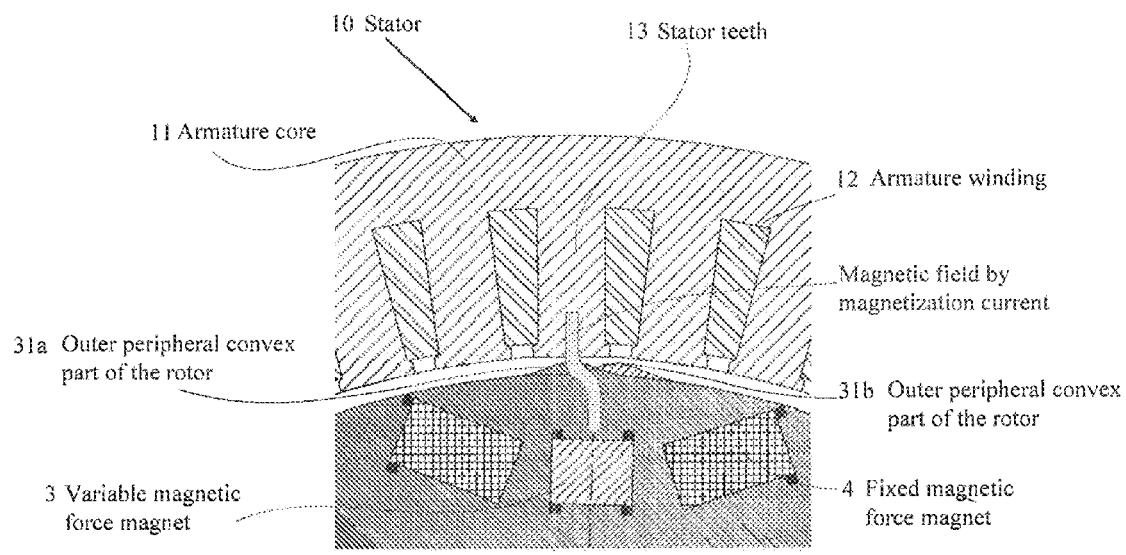
Figure 18B:
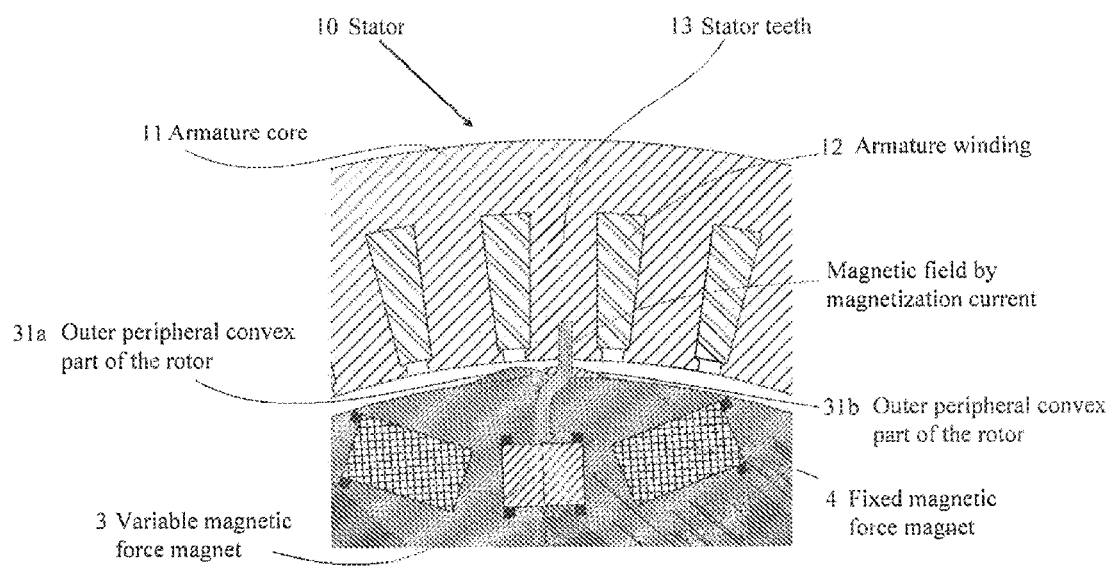
Figure 19:
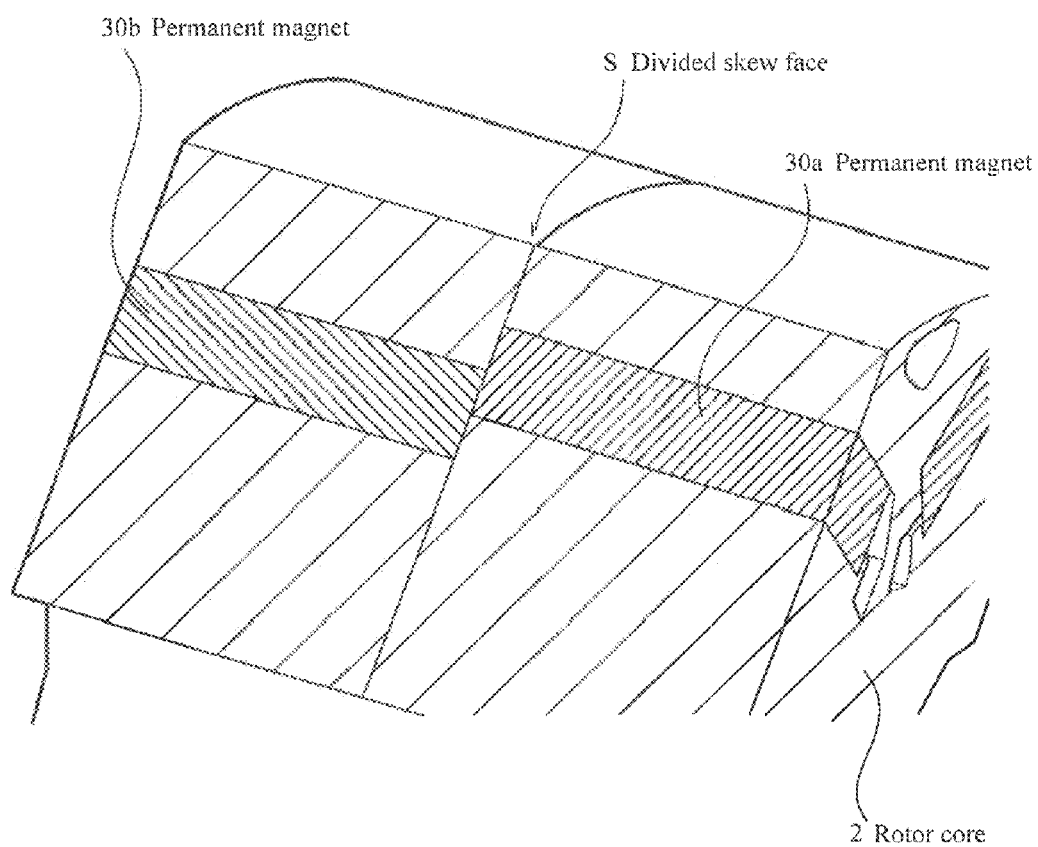
FIG. 19 is an enlarged axial cross section of a conventional divided core-type rotor.
Figure 20:
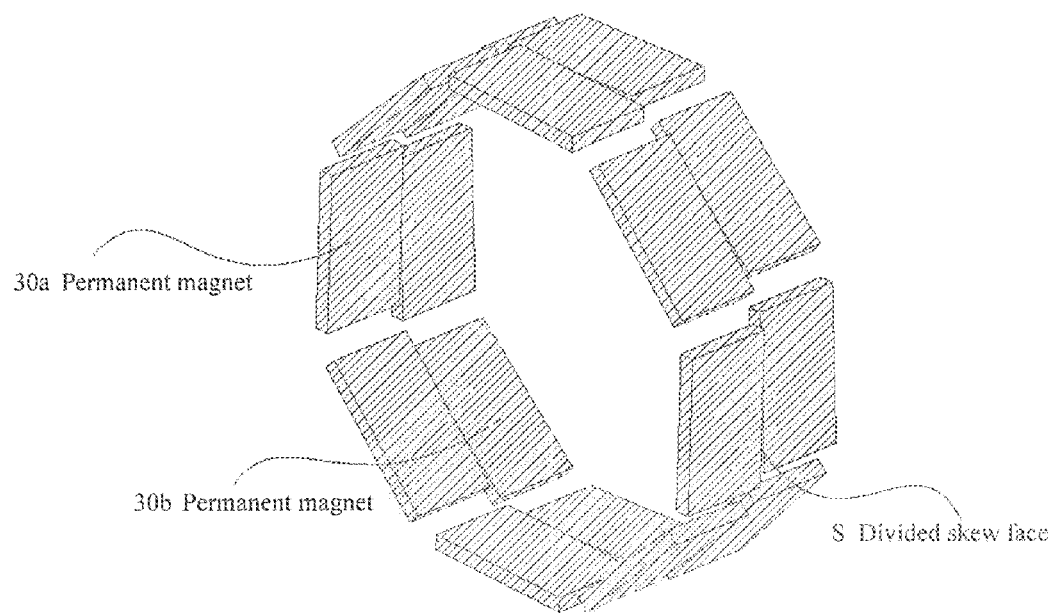
FIG. 20 is a perspective of the permanent magnet in a conventional divided core-type variable magnetic force permanent magnet electric motor.
Figure 21:
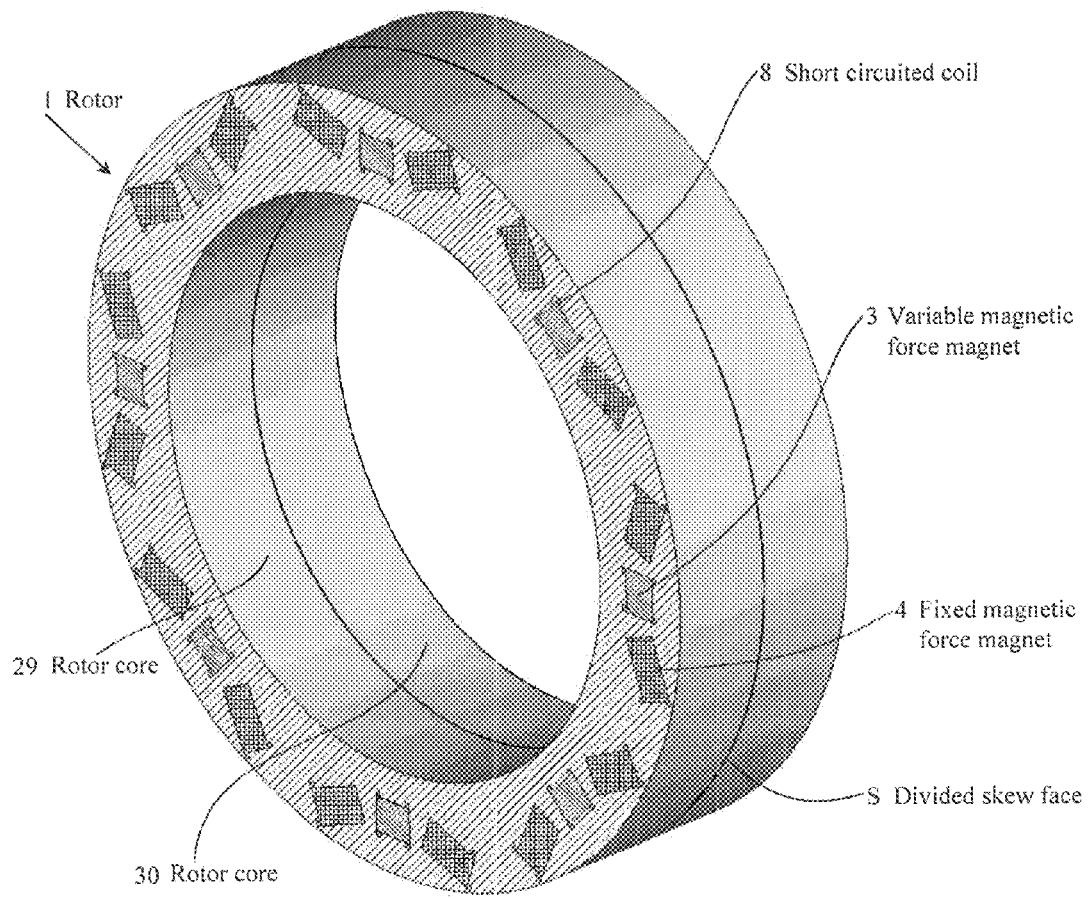
FIG. 21 is a perspective view of the rotor in a conventional divided core-type variable magnetic force permanent magnet electric motor.
Figure 22:
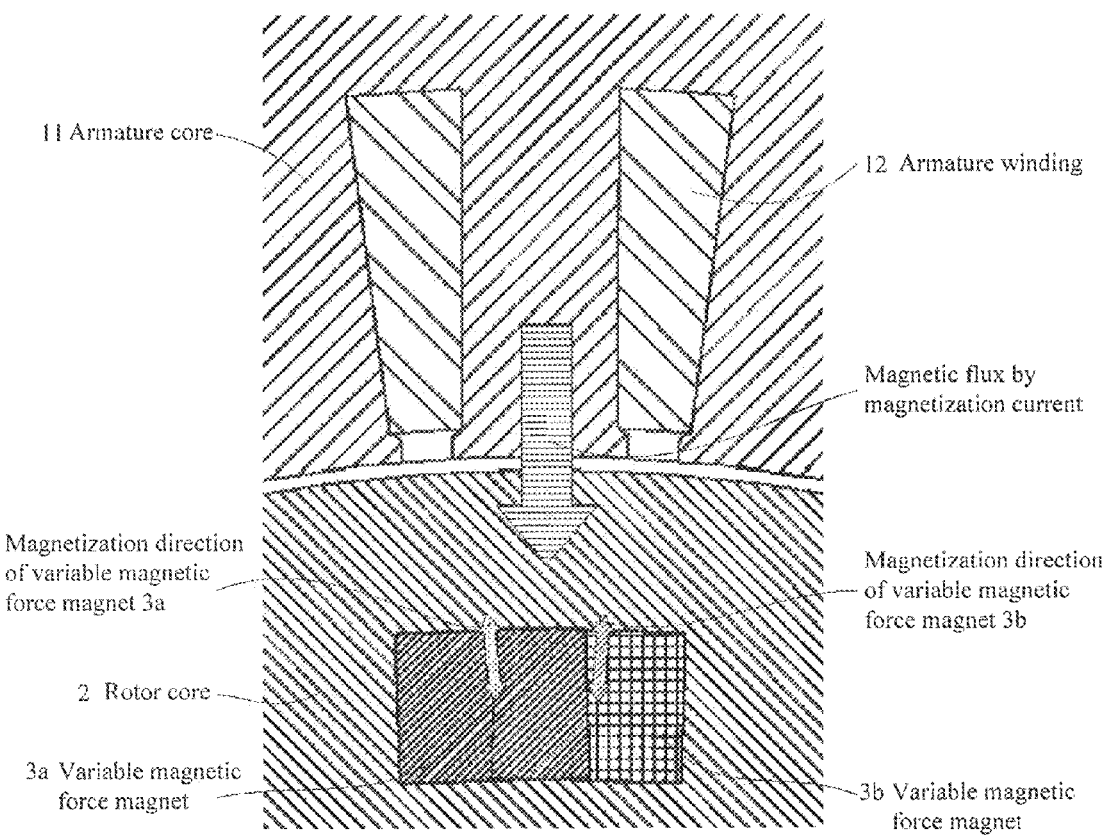
FIG. 22 is an enlarged radial cross section of a conventional divided core-type variable magnetic force permanent magnet electric motor.
Figure 23:
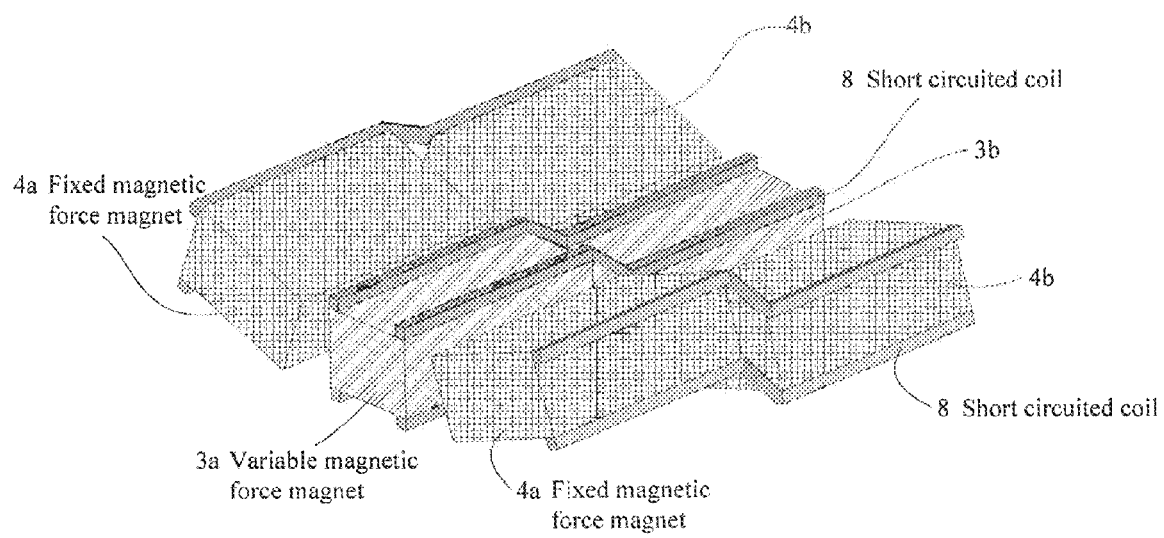
FIG. 23 is an enlarged perspective view of the permanent magnet and the short circuited coil in a conventional divided core-type variable magnetic force permanent magnet electric motor.

Particularly, in the ninth embodiment, as shown in FIGS. 18A and 18B, when the center of the magnetic field which magnetizes the variable magnetic force magnet 3 created by the armature winding and the center of the magnetic pole of the variable magnetic force magnet 3 of the rotor 2 coincide; that is, when the outer peripheral convex part 31 of the rotor coincides with the stator teeth 13, sufficient magnetization can be performed even in the variable magnetic force magnet 3 having a different magnetic pole center in the axial direction, and the magnetization current can be reduced.

(10) Other Embodiments

The present invention is not limited to the foregoing embodiments, and also covers the other embodiments described below.

(a) Although the skew function was exhibited by displacing the outer peripheral convex part 31 in the sixth embodiment to the eighth embodiment, in substitute for this outer peripheral convex part, it is also possible to adopt a means for exhibiting the skew function such as the permanent magnet arrangement, non-magnetic part, slit position and the like shown in the second embodiment to the fifth embodiment.

(b) In a variable magnetic force magnet-type electric motor, in substitute for obtaining the skew effect by offsetting the outer peripheral convex part 31 of the rotor cores 2a, 2b, it is also possible to obtain the skew effect based on the void or arrangement of strong and weak permanent magnets as shown in the second embodiment to the fifth embodiment. In the foregoing case, the same effect as the ninth embodiment can be obtained without having to change the configuration of the laminated rotor cores 2a, 2b in any way.

(c) In a variable magnetic force magnet-type electric motor, it is also possible to adopt a configuration of not dividing the core as shown in FIG. 9 or FIG. 10. In other words, the skew angle (displacement angle) can be further increased by arranging only the outer peripheral convex part 31 provided to the respective magnetic poles of the rotor 1 unequally in the circumferential direction for each magnetic pole, or arranging the outer peripheral convex part 31 unequally in the circumferential direction and additionally displacing the circumferential direction positions of the permanent magnets 3, 4, 4 in the respective magnetic poles in a direction that is opposite to the outer peripheral convex part 31.

(d) In a variable magnetic force magnet-type electric motor, a rotor core 2b in which the rotor cores 2a, 2a were reversed can also be laminated between the two rotor cores 2a, 2a where only the outer peripheral convex part 31 provided to the respective magnetic poles of the rotor 1 is unequally arranged in the circumferential direction for each magnetic pole. Moreover, in the foregoing case, the rotor core 2b disposed in the center can have a thickness that is double that of the rotor core 2a on either end.

(e) In the ninth embodiment, with the permanent magnet electric motor of claim 14 and claim 15, by performing magnetization when the center of the magnetic field which magnetizes the variable magnetic force magnet created by the armature winding and the center of the magnetic pole of the variable magnetic force magnet of the rotor coincide; that is, when the outer peripheral convex part of the rotor coincides with the stator teeth, sufficient magnetization can be performed even in the variable magnetic force magnet having a different magnetic pole center in the axial direction, and the magnetization current can be reduced.

(f) Although each of the foregoing embodiments illustrated an electric motor with eight poles, it goes without saying that the present invention can also be applied to a multipolar electric motor of twelve poles or the like. The arrangement position and shape of the permanent magnets will obviously change slightly according to the number of poles, but the operation and effect can be similarly obtained. Particularly, each of the foregoing embodiments disposes the variable magnetic force magnet at the center and disposes the fixed magnetic force magnet at either end, but the variable magnetic force magnet and the fixed magnetic force magnet can also be applied to other arrangements.

(g) The shape and position of the cavity that is provided for configuring the magnetic barrier to the peripheral side of the fixed magnetic force magnet in the rotor core 2 and the position of the cavity that is provided for deciding the product of the magnetic path cross section to the inner side of the fixed magnetic force magnet can be changed as needed according to the strength and the like of the magnetic field that is generated by the coercive force and magnetization current of the permanent magnets that are used. In the foregoing case, when reversing and superimposing the rotor cores 2a, 2b as in first embodiment, in addition to the outer peripheral convex parts 31a, 31b, the non-magnetic part 32, and the mounting hole of the permanent magnet, it is necessary to symmetrically form other cavities and the like relative to the center of the magnetic pole.

(h) If the rotor cores 2a, 2b of the same shape are not be to reversed and superimposed, the rotor cores 2a, 2b of separate shapes and different positions of the outer peripheral convex parts 31a, 31b may also be prepared. Moreover, the rotor cores 2a, 2b of different shapes may also be prepared and superimposed for the non-magnetic part 32 and the like.

The invention claimed is:
1. A permanent magnet electric motor, comprising:
a stator including an armature winding in a stator core; and
a rotor including a permanent magnet built into a rotor core, wherein a plurality of permanent magnets penetrating the rotor core in an axial direction thereof are arranged in the respective magnetic poles in the rotor core, equally in a circumferential direction of the rotor, the parts that cause magnetic properties to be different for each of the magnetic poles are provided in the respective magnetic poles such that the parts that cause magnetic properties to be different are unequally arranged in the circumferential direction, thereby causing the rotor core to exhibit a skew function, two or more types of permanent magnets having different products of a coercive force and a magnetization direction thickness are used as the permanent magnet, and a variable magnetic force magnet, which is at least one of the permanent magnets configuring the magnetic poles of the rotor, is magnetized by a magnetic field that is created by the armature winding, and the rotor includes a conductive member through which a short-circuit current flows by a magnetic flux that is generated during magnetization upon magnetizing the variable magnetic force magnet, and the conductive member is provided in the rotor to be adjacent to the permanent magnets except the variable magnetic force magnet and extend in an axial direction of the rotor core.

2. The permanent magnet electric motor according to claim 1, wherein the parts that cause magnetic properties to be different are formed, on rotor outer peripheries of the respective magnetic poles of the rotor core, as convex parts extending in an axial direction of the rotor, and unequally arranged as the convex parts in the circumferential direction of the rotor.

3. The permanent magnet electric motor according to claim 1, wherein the part that causes magnetic properties to be different are each disposed as a magnetic barrier made from a non-magnetic material or a void such that the magnetic barrier is asymmetrical relative to the center of a permanent magnet mounting hole in the circumferential direction on the permanent magnet outer peripheral side of the rotor core.

4. The permanent magnet electric motor according to claim 1, wherein the parts that cause magnetic properties to be different are disposed as a plurality of magnets having different magnetic forces in the respective magnetic poles of the rotor core such that the alignment of the magnets is made different for each of the divided rotor cores.

5. The permanent magnet electric motor according to claim 1, wherein the parts that cause magnetic properties to be different are each disposed as a slit on the permanent magnet outer peripheral side of the rotor core such that the position of the slit is displaced with respect to the center of the permanent magnet in the circumferential direction.

6. The permanent magnet electric motor according to claim 1, wherein magnetization is performed when the center of the magnetic field that is created by the armature winding and magnetizes the variable magnetic force magnet coincides with the center of the magnetic pole of the variable magnetic force magnet of the rotor.

7. A permanent magnet electric motor, comprising:
a stator including an armature winding in a stator core; and
a rotor including a permanent magnet built into a rotor core,
wherein a plurality of permanent magnets penetrating the rotor core in an axial direction thereof are arranged in respective magnetic poles in the rotor core such that the permanent magnets are displaced by a given angle that is determined by a pole pitch,
parts that cause magnetic properties to be different for each of the magnetic poles are provided in the respective magnetic poles of the rotor core such that the parts that cause magnetic properties to be different are unequally arranged in the circumferential direction, thereby causing the rotor core to exhibit a skew function, two or more types of permanent magnets having different products of a coercive force and a magnetization direction thickness are used as the permanent magnet, and a variable magnetic force magnet, which is at least one of the permanent magnets configuring the magnetic poles of the rotor, is magnetized by a magnetic field that is created by the armature winding, and the rotor includes a conductive member through which a short-circuit current flows by a magnetic flux that is generated during magnetization upon magnetizing the variable magnetic force magnet, and the conductive member is provided in the rotor to be adjacent to the permanent magnets except the variable magnetic force magnet and extend in an axial direction of the rotor core.

8. The permanent magnet electric motor according to claim 7, wherein magnetization is performed when the center of the magnetic field that is created by the armature winding and magnetizes the variable magnetic force magnet coincides with the center of the magnetic pole of the variable magnetic force magnet of the rotor.

9. The permanent magnet electric motor according to claim 7, wherein the parts that cause magnetic properties to be different are formed, on rotor outer peripheries of the respective magnetic poles of the rotor core, as convex parts extending in an axial direction of the rotor, and unequally arranged as the convex parts in the circumferential direction of the rotor.

10. The permanent magnet electric motor according to claim 7, wherein the parts that cause magnetic properties to be different are each disposed as a magnetic barrier made from a non-magnetic material or a void such that the magnetic barrier is asymmetrical relative to the center of a permanent magnet mounting hole in the circumferential direction on the permanent magnet outer peripheral side of the rotor core.

11. The permanent magnet electric motor according to claim 7, wherein the parts that cause magnetic properties to be different are disposed as a plurality of magnets having different magnetic forces in the respective magnetic poles of the rotor core such that the alignment of the magnets is made different for each of the divided rotor cores.

12. The permanent magnet electric motor according to claim 7, wherein the parts that cause magnetic properties to be different are each disposed as a slit on the permanent magnet outer peripheral side of the rotor core such that the position of the slit is displaced with respect to the center of the permanent magnet in the circumferential direction.

13. A permanent magnet electric motor, comprising:
a stator including an armature winding in a stator core; and
a rotor including a permanent magnet built into a rotor core,
wherein the rotor core is divided into two or more rotor cores in an axial direction,
a plurality of permanent magnets penetrating the rotor core in an axial direction thereof are arranged in the respective magnetic poles in the rotor core,
the parts that cause magnetic properties to be different for each of magnetic poles of the divided rotor cores are provided in the respective magnetic poles such that the parts that cause magnetic properties to be different are unequally arranged in a circumferential direction, and
the parts that cause magnetic properties to be different are arranged so as to be displaced for each of the divided cores, thereby causing the rotor core to exhibit a skew function, two or more types of permanent magnets having different products of a coercive force and a magnetization direction thickness are used as the permanent magnet, and a variable magnetic force magnet, which is at least one of the permanent magnets configuring the magnetic poles of the rotor, is magnetized by a magnetic field that is created by the armature winding, and the rotor includes a conductive member through which a short-circuit current flows by a magnetic flux that is generated during magnetization upon magnetizing the variable magnetic force magnet, and the conductive member is provided in the rotor to be adjacent to the permanent magnets except the variable magnetic force magnet and extend in an axial direction of the rotor core.

14. The permanent magnet electric motor according to claim 13, wherein the parts that cause magnetic properties to be different are formed, on rotor outer peripheries of the respective magnetic poles of the rotor core, as convex parts extending in an axial direction of the rotor, and unequally arranged as the convex parts in the circumferential direction of the rotor.

15. The permanent magnet electric motor according to claim 13, wherein the parts that cause magnetic properties to be different are each disposed as a magnetic barrier made from a non-magnetic material or a void such that the magnetic barrier is asymmetrical relative to the center of a permanent magnet mounting hole in the circumferential direction on the permanent magnet outer peripheral side of the rotor core.

16. The permanent magnet electric motor according to claim 13, wherein the parts that cause magnetic properties to be different are disposed as a plurality of magnets having different magnetic forces in the respective magnetic poles of the rotor core such that the alignment of the magnets is made different for each of the divided rotor cores.

17. The permanent magnet electric motor according to claim 13, wherein the parts that cause magnetic properties to be different are each disposed as a slit on the permanent magnet outer peripheral side of the rotor core such that the position of the slit is displaced with respect to the center of the permanent magnet in the circumferential direction.

18. The permanent magnet electric motor according to claim 13, wherein magnetization is performed when the center of the magnetic field that is created by the armature winding and magnetizes the variable magnetic force magnet coincides with the center of the magnetic pole of the variable magnetic force magnet of the rotor.

* * * * *